United States Patent
Harp et al.

(10) Patent No.: US 7,421,738 B2
(45) Date of Patent: *Sep. 2, 2008

(54) SKEPTICAL SYSTEM

(75) Inventors: Steven A. Harp, Coon Rapids, MN (US); Christopher W. Geib, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1010 days.

This patent is subject to a terminal disclaimer.

(21) Appl. No.: 10/303,223

(22) Filed: Nov. 25, 2002

(65) Prior Publication Data

US 2004/0103296 A1    May 27, 2004

(51) Int. Cl.
    *G06F 11/00* (2006.01)
(52) U.S. Cl. .......................... 726/25; 726/23
(58) Field of Classification Search ........... None
    See application file for complete search history.

(56) References Cited

U.S. PATENT DOCUMENTS

| | | | |
|---|---|---|---|
| 5,229,764 | A | 7/1993 | Matchett et al. |
| 5,621,889 | A | 4/1997 | Lermuzeaux et al. |
| 6,405,318 | B1 | 6/2002 | Rowland |
| 6,742,128 | B1 * | 5/2004 | Joiner .................. 726/25 |
| 2001/0001156 | A1 | 5/2001 | Leppek |
| 2001/0054020 | A1 * | 12/2001 | Barth et al. .................. 705/37 |
| 2003/0005326 | A1 * | 1/2003 | Flemming .................. 713/201 |

OTHER PUBLICATIONS

Ha et al., "Balancing Safety Against Performance: Tradeoffs in Internet Security", Proceedings of the 36th Hawaii Intl. Conference on System Sciences, Jan. 2003.
Goldman et al., "A Probabilistic Approach to Plan-recognition and Text Understanding Work in Progress", Aug. 9, 1989, pp. 1-6.
Charniak et al., "A Bayesian model of plan recognition", Artificial Intelligence 64 Elsevier (1993) pp. 53-79.
Kautz et al., "Generalized Plan Recognition", Proceedings aaai-86, fifth national conference on artificial intelligence Aug. 11-15, 1986, vol. 1 Science, pgs. front page & 32-37.
Kautz, "A formal theory of plan recognition", 1987, UMI.
Carberry, "Incorporating Default Inferences into Plan Recognition", AAAI-90, Proceedings Eight National Conference on Artificial Intelligence, vol. 1, Jul. 29, 1990-Aug. 3, 1990, pgs. front page & 471-478.
Vilain, "Deduction as Parsing: Tractable Classification in the KL-ONE Framework", AAAI-91, Proceedings Ninth National Conference on Artificial Intelligence, vol. 1, Jul. 14-19, 1991, pgs. front page & 464-467.

(Continued)

*Primary Examiner*—Pramila Parthasarathy
(74) *Attorney, Agent, or Firm*—Krist T. Fredrick

(57) ABSTRACT

A skeptical system protects an asset by monitoring commands of a user, predicting a plan of the user based on the monitored commands, inferring an actual plan from the predicted plan, receiving information related to an identity of the user, inferring an actual identity of the user from the information, assessing a threat based on the actual plan and the actual user identity, and selecting, from among a plurality of possible responses, a response that is appropriate to the assessed threat.

36 Claims, 17 Drawing Sheets

OTHER PUBLICATIONS

Gertner et al., "Procedural help in Andes: Generating hints using a Bayesian network student model", Proceedings of the 15th National Conference on Artificial Intelligence, 1998, pgs. 106-111.

Horvitz et al., "A Computational Architecture for Conversation", Proceedings of the 7th International Conference on User Modeling, 1999, pgs. 201-210.

Horvitz et al., "The Lumiére Project: Bayesian User Modeling for Inferring the Goals and Needs of Software Users", Proceedings of the 14th Conference on Uncertainty in Artificial Intelligence, 1998, pp. 256-265.

Heckerman et al., "Inferring Informational Goals from Free-Text Queries: A Bayesian Approach", Proceedings of the 14th Conference on Uncertainty in Artificial Intelligence, 1998, pp. 230-237.

Sidner, Plan parsing for intended response recognition in discourse[1], Computational Intelligence, vol. 1, Jan. 10, 1985, pp. 1-10.

Kaminka et al., "Monitoring Deployed Agent Teams", Proceedings of the International Conference on Autonomous Agents, 2001, pp. 308-315.

Pynadath et al., "Probabilistic State-Dependent Grammars for Plan Recognition", Proceedings of the Conference on Uncertainty in Artificial Intelligence, 2000, pp. 507-514.

Geib et al., "Probabilistic Plan Recognition for Hostile Agents".

Carberry, "Incorporating Default Inferences into Plan Recognition", AAAI-90, Proceedings Eight National Conference on Artificial Intelligence, vol. 1, Jul. 29, 1990-Aug. 3, 1990, pgs. front page & 471-478.

Vilain, "Deduction as Parsing: Tractable Classification in the KL-ONE Framework", AAAI-91, Proceedings Ninth National Conference on Artificial Intelligence, vol. 1, Jul. 14-19, 1991, pgs. front page & 464-467.

Gertner et al., "Procedural help in Andes: Generating hints using a Bayesian network student model", Proceedings of the 15th National Conference on Artificial Intelligence, 1998, pp. 106-111.

Horvitz et al., "A Computational Architecture for Conversation", Proceedings of the 7th International Conference on User Modeling, 1999, pp. 201-210.

Horvitz et al., "The LumiéProject: Bayesian User Modeling for Inferring the Goals and Needs of Software Users", Proceedings of the 14th Conference on Uncertainty in Artificial Intelligence, 1998, pp. 256-265.

Heckerman et al., "Inferring Informational Goals from Free-Text Queries: A Bayesian Approach", Proceedings of the 14th Conference on Uncertainty in Artificial Intelligence, 1998, pp. 230-237.

Sidner, Plan parsing for intended response recognition in discourse[1], Computational Intelligence, vol. 1, Jan. 10, 1985, pp. 1-10.

Kaminka et al., "Monitoring Deployed Agent Teams", Proceedings of the International Conference on Autonomous Agents, 2001, pp. 308-315.

Pynadath et al., "Probabilistic State-Dependent Grammars for Plan Recognition", Proceedings of the Conference on Uncertainty in Artificial Intelligence, 2000, pp. 507-514.

* cited by examiner

SKEPTICAL SYSTEM

This invention was made with Government support under Contract F30602-02-C-0116 awarded by the Air Force. The Government has certain rights in this invention.

TECHNICAL FIELD OF THE INVENTION

The present invention relates to a skeptical system for making critical computer systems more secure. The skeptical system of the present invention can be used in a wide variety of applications such as energy, chemicals, transportation, defense, etc.

BACKGROUND OF THE INVENTION

Security measures such as firewalls, cryptography, intrusion detection, network management, and pass words have been used in an attempt to make computer systems more resistant to unauthorized access. But even with these measures, computer systems remain vulnerable and can be exploited by hackers as well as by insiders who have legitimate access to at least portions of the computer systems. For example, insiders (who may include authorized users) are currently able to do largely as they please, and outsiders (such as hackers) can slip through the vulnerabilities in the security measures currently in use to gain authorization. The list of vulnerabilities of computer systems is large and growing.

The threat from insiders is particularly troublesome. It has been estimated that perhaps 75% of computer security breeches come from authorized users. The average cost of an authorized user attack, according to the FBI, is $2.7 million. In a law enforcement panel discussion at a well-known Las Vegas hacker convention in August 2001, a panel member informed the audience that the truly dangerous threat comes from insiders.

That vulnerabilities exist and that new ones are continuously being discovered are evidenced by the growth of vulnerability databases such as CVE by the MITRE Corporation and Bugtraq by SecurityFocus. Two industry trends have amplified the vulnerability problem.

The first trend is the increased reliance by users of commercial-off-the-shelf (COTS) software packages. These products typically place security as a distinctly secondary goal behind the goals of power and convenience.

The second trend relates to the software monoculture that is typified by attempts at software standardization. However, while it is easier to manage training and installation when all of the nodes of a system are identically configured, this node standardization amplifies the risk of unauthorized access. If one node in the system is susceptible to some vulnerability, nearly all of the nodes in the system are likewise susceptible. The success of viruses and worms such as Melissa, NIMDA, CodeRed, etc. in bringing corporate networks to a standstill is a recurring demonstration of this weakness.

Critical systems warrant a further layer of security. Security systems currently exist that, in a rudimentary way, predict likely outcomes of user commands. These security systems use physical (or other) models to reason out the effect of certain commands on a protected asset. For example, mathematical models are currently used in "power system security" analysis. That is, the operator of an electric power grid may use a mathematical model of load, power generation, voltage, and current everywhere over the power grid to make sure that planned changes will leave the grid in a stable safe state, even if one or more faults occur. Thus, before a proposed power transfer from point A to point B is implemented, the model simulates various possible line outages that could occur in order to make sure that, in spite of such outages (or other planned transfers), the power grid will remain in a stable state (no overloads, blackouts, etc.). A basic reference on this topic is a text entitled "Power Generation, Operation and Control", by Allen Wood and Bruce Wollenberg.

For the most part, current computer systems promptly obey any commands issued by the last authenticated operator so long as the commands fall within the privileges granted. Even when a system attempts to predict outcomes of user actions, such systems are not fully integrated so as to anticipate future commands of a user and to consider a range of responses dependent on the level of the threat of the future commands.

Accordingly, the present invention is directed to a skeptical system that can be used in association with assets (such as computers) to increase the level of protection afforded against unauthorized entry and/or use. The skeptical system of the present invention entertains doubts about the entry and/or of the protected assets. It questions the authenticity, integrity, and intent of the requester and acts with due consideration of its doubts.

SUMMARY OF THE INVENTION

In accordance with one aspect of the present invention, a skeptical method of protecting an asset is implemented by a processing system and comprises the following: monitoring commands of a user; predicting a plan of the user based on the monitored commands; assessing a threat based on the predicted plan; and, selecting, from among a plurality of possible responses, a response that is appropriate to the assessed threat.

In accordance with another aspect of the present invention, a skeptical method of protecting an asset is implemented by a processing system and comprises the following: monitoring commands of a user; matching the commands to plans stored in a plan library; predicting a plan of the user from the matching plans; receiving information related to an identity of the user; accessing a threat assessment from a memory based on the predicted plan and the user identification information; and, selecting, from among a plurality of possible responses, a response that is appropriate to the accessed threat assessment.

BRIEF DESCRIPTION OF THE DRAWINGS

These and other features and advantages will become more apparent from a detailed consideration of the invention when taken in conjunction with the drawings in which.

DETAILED DESCRIPTION

The skeptical system of the present invention performs continuous evaluation of a user's right to continue to use an associated asset, such as a computer system. By contrast, many existing security systems authenticate a user's right to access just once, at the beginning of a session. Hijacking such a session defeats this authentication. It is important that the continuous evaluation process be conducted without irritating the users. Otherwise, the users will be reluctant to employ the skeptical system.

Figure 1:
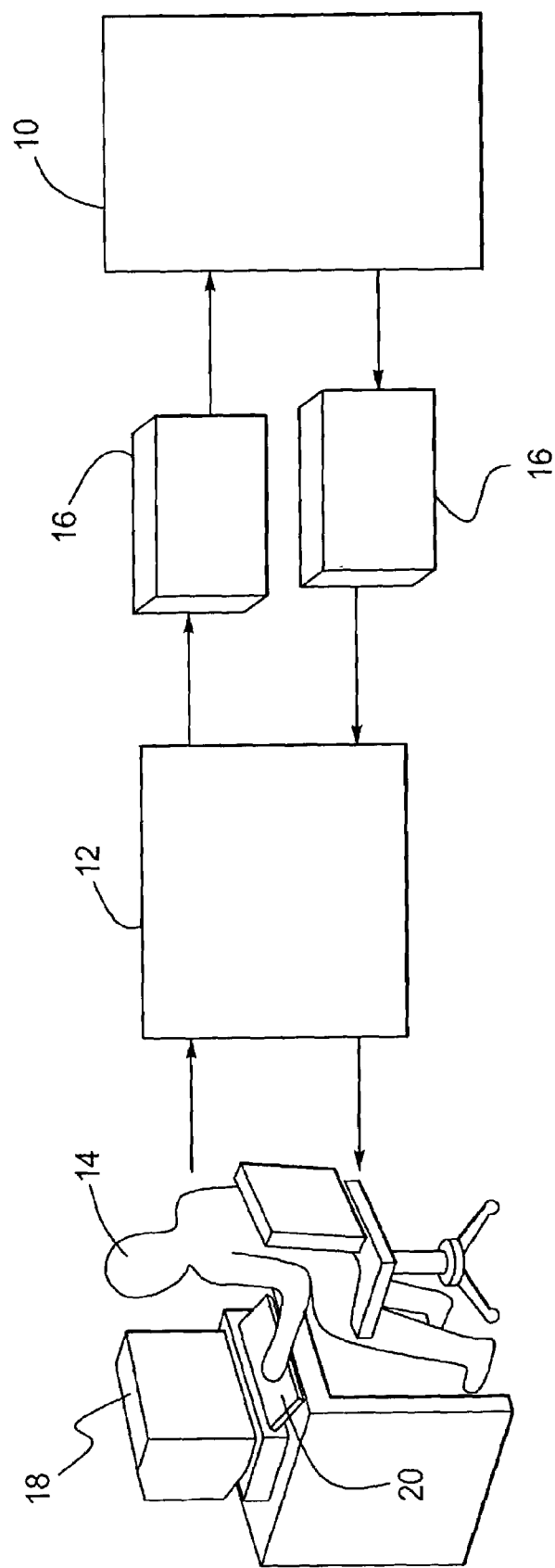
FIG. 1 illustrates an exemplary chemical plant environment in which the skeptical system of the present invention may be used.

As shown in FIG. 1, an asset 10 such as a chemical plant is safeguarded by a skeptical system 12. The skeptical system 12 stands between all external commands initiated by a user 14 and a control system 16 that regulates the asset 10. The user 14 interacts with the process via a user interface 18. As the user 14 presses buttons such as on a keyboard 20 or a mouse, the skeptical system 12 makes a number of inquiries such as (i) what are the possible implications of the current command sequence being input by the user 14 with respect to plant safety, production, environment, property, etc., (ii) is the user 14 of the control system 16 a valid user, (iii) is the user 14 indisposed and is someone else is pressing the buttons, (iv) is the user 14 behaving erratically, and/or (v) are there others with the user 14?

Some of these questions may be dismissed easily. For example, the skeptical system 12 may include a camera to monitor activity in a viewing area that includes the area in which the user 14 interacts with the interface 18, the keyboard 20, and/or a mouse. If the user 14 captured by the camera matches the official photograph of the valid user, and if the skeptical system 12 determines that the typing pattern from the keyboard 20 and/or the pointing pattern relative to a pointing device such as mouse, a trackball, or a touch screen matches the one learned for the valid user, the skeptical system 12 gains some confidence as to the authenticity of the user 14. However, positive answers to one or more of the skeptical questions listed above would lead to an elevated level of suspicion.

The skeptical system 12 can be arranged to respond in a graded manner depending on the level of suspicion. For example, the skeptical system 12 may (i) simply log a suspicion for later analysis, (ii) ask the user 14 whether the user 14 understands the possible consequences of a control action or a series of control actions undertaken by the user 14, (iii) require a greater level of authentication such as asking for a password, personal information, and/or a physical key device to be produced, acquiring biometric confirmation, or the like, (iv) notify others (operators, managers, engineers) of possible doubts that the skeptical system 12 may have about the user 14 or about the control actions initiated by the user 14, (v) enable delays to prevent catastrophic changes, (vi) require confirmation from others before allowing the user 14 to proceed, and/or (vii) refuse to proceed such as by locking out the control console and taking automated steps to "park" the plant 10 in a safe operating region.

There are a number of instances in which it would be desirable for the skeptical system 12 to take control or otherwise raise doubts about the user 12 or about the command entry actions of the user 14. As examples of such instances, (i) the user 14 may be performing with a limited rationality such as where the user has forgotten some detail or is unaware of a special condition and hence inadvertently asks the protected asset to do something very costly or dangerous, or (ii) data entry, through clumsiness, is not 100% reliable allowing incorrect commands (or more often their parameters) to enter the protected asset, or (iii) the user 14 may suffer from a medical condition, such as sleep deprivation or drug impairment, so that the user 14 cannot effectively command the protected asset, or (iv) saboteurs, terrorists, or hard-core criminals may have seized control of the protected asset, or (v) the protected asset has been hacked by an unauthorized agent, or (vi) the user 14 has been tricked so that the user 14 is acting on dangerously erroneous information.

The skeptical system of the present invention is useful in a wide variety of systems. For example, the skeptical system of the present invention is useful in the area of transportation to prevent hijackings and accidents. Thus, a skeptical system in an airplane could detect malicious intent on the part of the person at the controls, using evidence such as deviation from flight plan, disabling transponders, and flying below 5000 feet. In process controls, the present invention can be used to defeat sabotage, espionage, and careless errors. In the area of building security, a skeptical system can prevent unauthorized or inappropriate defeat of environmental control and security. In weapons systems, a skeptical system is useful to prevent unauthorized examination or use.

There are currently a number of existing arrangements that attempt to protect the use of certain machines. For example, interlocks on machines, electrical equipment, and plumbing prevent access and/or operation under certain conditions, e.g. spinning, energized, pressurized. Safety systems on trains prevent drivers from entering junctions that are not clear, or from taking curves at too high a speed. Dead-man switches on trains demand periodic button presses to prove the attentiveness of the driver such that failure to press on time will brake the train. Launch controls for certain weapons demand agreement by multiple operators. Automatic ground collision avoidance has been proposed to automatically fly an aircraft away from the ground if the pilot becomes unconscious. Computer warning dialogs with users offer the user the chance to continue or abort an operation that cannot be easily reversed for such operations as permanently erasing a file or closing a file without saving. Virus protection systems refuse to execute programs that appear to be infected with a computer virus. The defensive programs of Crispin Cowan, such as StackGuard and FormatGuard, monitor for the exploitation of particular classes of vulnerabilities.

Some subtlety with respect to existing systems has been proposed. For example, it has been suggested to delay system calls in computer applications suspected of having been compromised. It has also been suggested to use a protocol that forces clients (applications) to solve "puzzles" under certain conditions to mitigate denial-of-service attacks.

However, none of these systems are fully integrated. In most cases, they fail to predict actions that have not as yet occurred, and they fail to provide a graded skeptical response in that their responses are at the extremes, either non-existent or brutal.

An embodiment of the skeptical system of the present invention acknowledges uncertainty because perfect knowledge of the intentions, integrity, or even authenticity of a user is seldom possible. Thus, instead of a lock that is either fully open or closed, the skeptical system may have gradations of compliance, to dynamically varied in proportion to its trust in the command issuer and the consistency of the command stream with the system's mission.

The skeptical system of the present invention can incorporate multiple technologies. For example, the skeptical system of the present invention can employ passive biometrics that identify the command issuer on a frequent basis without interrupting workflow. Such passive biometrics can include (i) face recognition identification, (ii) fingerprint identification, (iii) voice print identification, (iv) user-specific models that identify users according to their ideosynchratic input-device operation such as keystroke timing, pressure, and/or typical errors, and/or (v) stress detection through acoustic, visual and/or infrared sensing, etc. Face recognition can include multispectral face recognition that sees through disguises. Fingerprint identification can be implemented through the use of a standalone fingerprint reader or a touch screen or mouse with fingerprint identification capability.

As another example, the skeptical system can be arranged to learn the users' individual interaction patterns and standard operating procedures in order to identify the user and to check the user's integrity. Users have certain patterns of interaction with computers that skeptical systems can learn and associate with the users. For example, user A might habitually follow the same sequence of logging on to a computer, opening an e-mail application, reading and answering e-mail, opening a word processing application, opening a spread sheet program, etc. The skeptical system of the present invention can be arranged to recognize this command pattern and to associate this pattern with user A.

As still another example, the skeptical system of the present invention can be arranged to recognize and track a user's plans or intent. Plan or intent recognition and tracking may include logging the commands of the user and using a library of known plans to infer hostile plans by the user. Thus, as the user enters each command, the skeptical system adds this command to the preceding commands to form command sequence and compares this command sequence to the corresponding sequences of the plans stored in a plan library. If the command sequence matches the initial commands of a plan stored in the plan library, subsequent commands in the matching plan may then be inferred. The recognition of such a hostile plan would then allow an inference of intent on the part of the user, and permit steps to be taken in order to mitigate possibly damaging outcomes of the plan. Thus, plan recognition is inferring the goals of an agent from observations of that agent's actions.

Goldman, R. P., Geib, C. G., Miller C. W. (1999), in "A new model of plan recognition," *Proceedings of the 1999 Conference on Uncertainty in Artificial Intelligence*, disclose probabilistic abductive plan recognition that is centered on plan execution and that addresses issues such as world state and context, multiple interleaved plans, partially ordered plans, and negative evidence (a lack of a report of an action.) This disclosure goes beyond the previous framework of Charniak and Goldman in "A Bayesian model of plan recognition," *Artificial Intelligence*, Vol. 64, pp 53-79, (1993) who proposed the use of Bayesian inference to handle explanations of the same complexity but different likelihoods.

It can be assumed that not all of a hostile agent's actions can be perceived. Instead, as indicated above, the observed sequence of actions should be combined (such as from the plan library) with hypothesized unobserved actions consistent with the observed actions, with observed state changes, and with a plan graph in order to predict the plan of the agent. A probability distribution can be erected over each set of hypothetical goals and plans implicated by each of the traces and pending sets.

Figure 2:
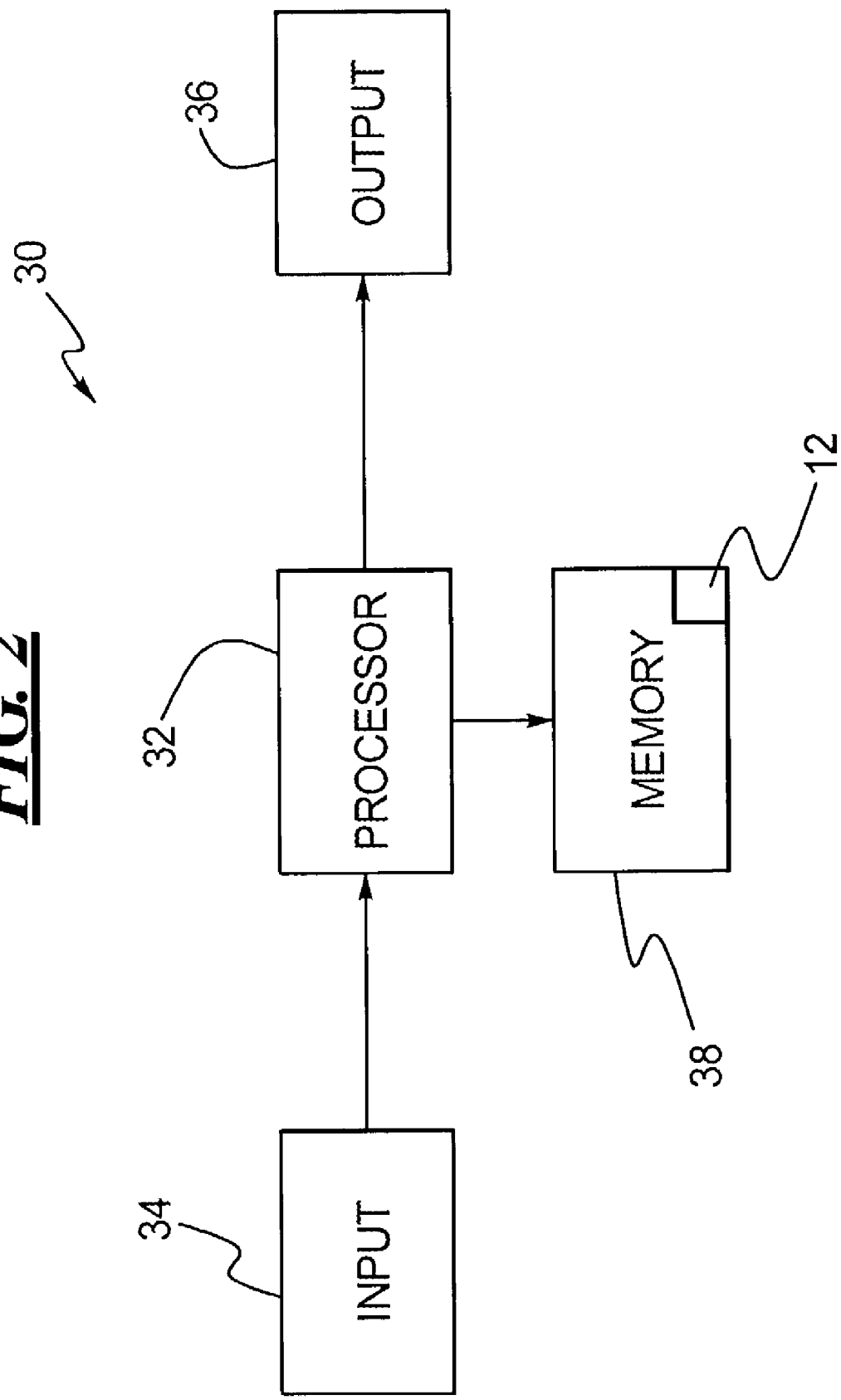
FIG. 2 illustrates a system providing an operating environment for the skeptical system of the present invention.

The skeptical system 12 may be implemented by a system 30 such as that shown in FIG. 2. The system 30 includes a processor that receives inputs from one or more input devices 34 and provides outputs to one or more output devices 36 based on programs and data stored in a memory 38. For example, the input devices 34 may include one or more of the following: the keyboard 20, a mouse, biometric and other sensing and measurement devices such as those discussed herein, etc. The output devices 36 may include one or more of the following: one or more printers, one or more monitors supporting the user interface 18, more or more actuators, one or more controllers such as the control system 16, etc. The memory 38 stores data and such programs as the skeptical system 12. The memory 38 also stores the plan library discussed herein.

Figure 3:
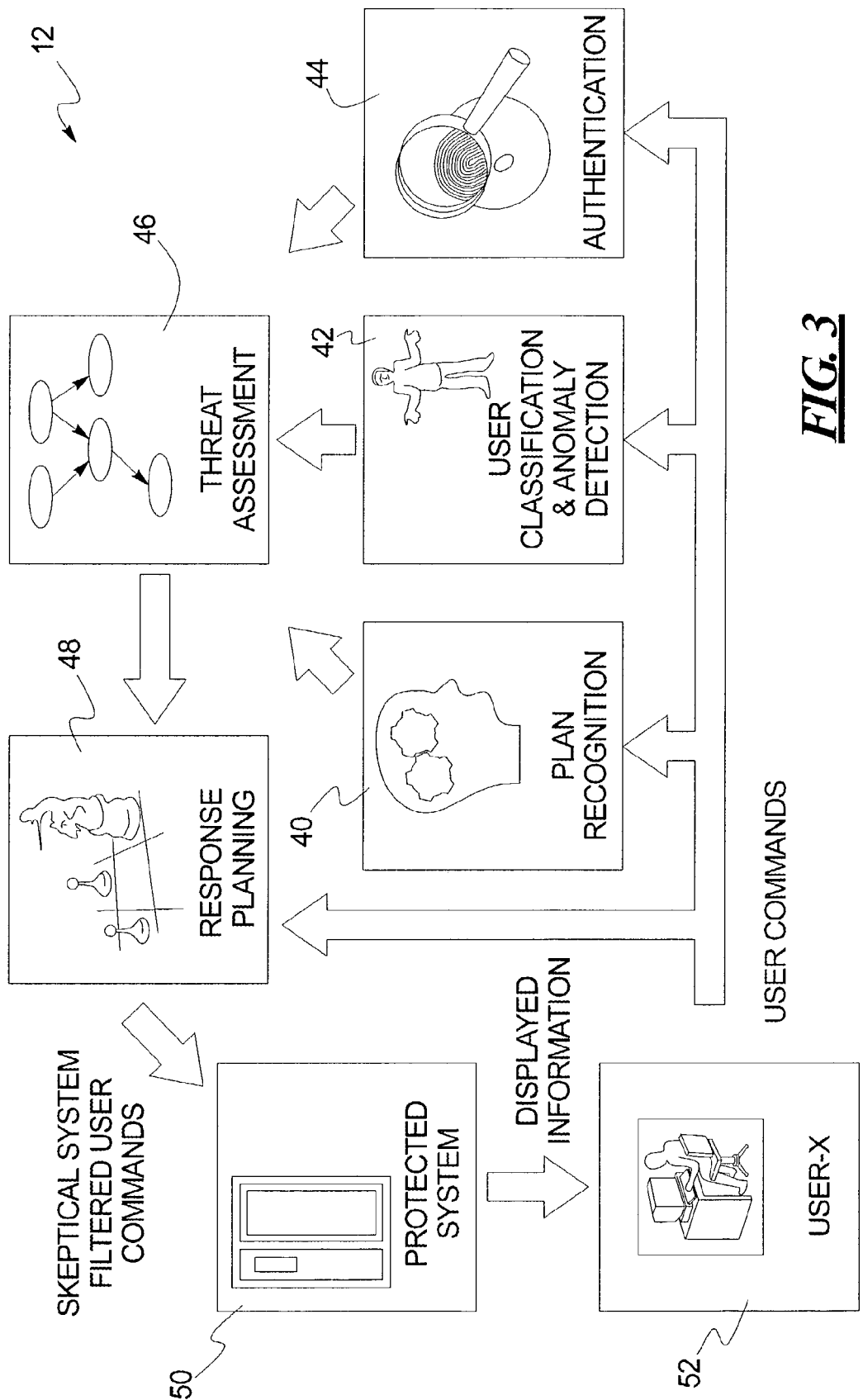
FIG. 3 illustrates an exemplary software architecture of the skeptical system according to the present invention.

A software architecture comprising the skeptical system 12 is shown in FIG. 3 and includes a plan recognition module 40, a user classification and anomaly detection module 42, an authentication module 44, a threat assessment module 46, and a response planning module 48. The skeptical system 12 is used to protect such assets 50 as databases, computer networks, airplanes, weapon systems, automobiles, process control systems, security systems, environmental control systems, etc.

The plan recognition module 40 implements a plan recognition methodology in order to predict the plans of a user 52. Thus, the plan recognition module 40 continuously monitors the command inputs issued by the user 52. These command inputs indicate action sequences and state changes initiated by the user 52 or otherwise. Based at least partly on plans of the plan library stored in the memory 38, the plan recognition module 40 hypothesizes unobserved actions that have taken or will take place and that are consistent with the observed actions, the observed state changes, and the plans stored in the plan library. Accordingly, the plan recognition module 40 creates a set of possible execution traces such as by use of the plans in the plan library stored in the memory 38. This set of execution traces indicates a pending set of actions by the user 52 that have not as yet been observed but that are possible from the observed actions, the observed state changes, and the plans stored in the plan library. The plan recognition module 40 then determines a probability distribution pertinent to the actions in the set of pending actions. Finally, the plan recognition module 40 supplies these sets of pending actions and corresponding probabilities to the threat assessment module 46.

In general terms, the plan recognition module 40 incorporates simple hierarchical (task decomposition) plans, and references information in the plan library, observed actions, and hypothesized unobserved actions in order to recognize or evaluate the likelihood that the user is engaged in a particular plan otherwise described in the plan library.

The plan library stores a listing of possible goals of the user 14, along with "recipes" for achieving each of those goals. In particular, a sub-listing of at least one plan is provided for each goal. Within each plan, an activity plan graph is provided that consists of required primitive actions for completing the corresponding plan. In an embodiment of the present invention, entries in the plan library may be viewed as an "and/or tree". An example hierarchical plan library for an in-home actor monitoring and support domain is provided in diagrammatical form in FIG. 4. The plan library lists three possible root goals (referenced in FIG. 4 as "G") of "Feed-dog," "Eat," and "Answer-phone".

Figure 4:
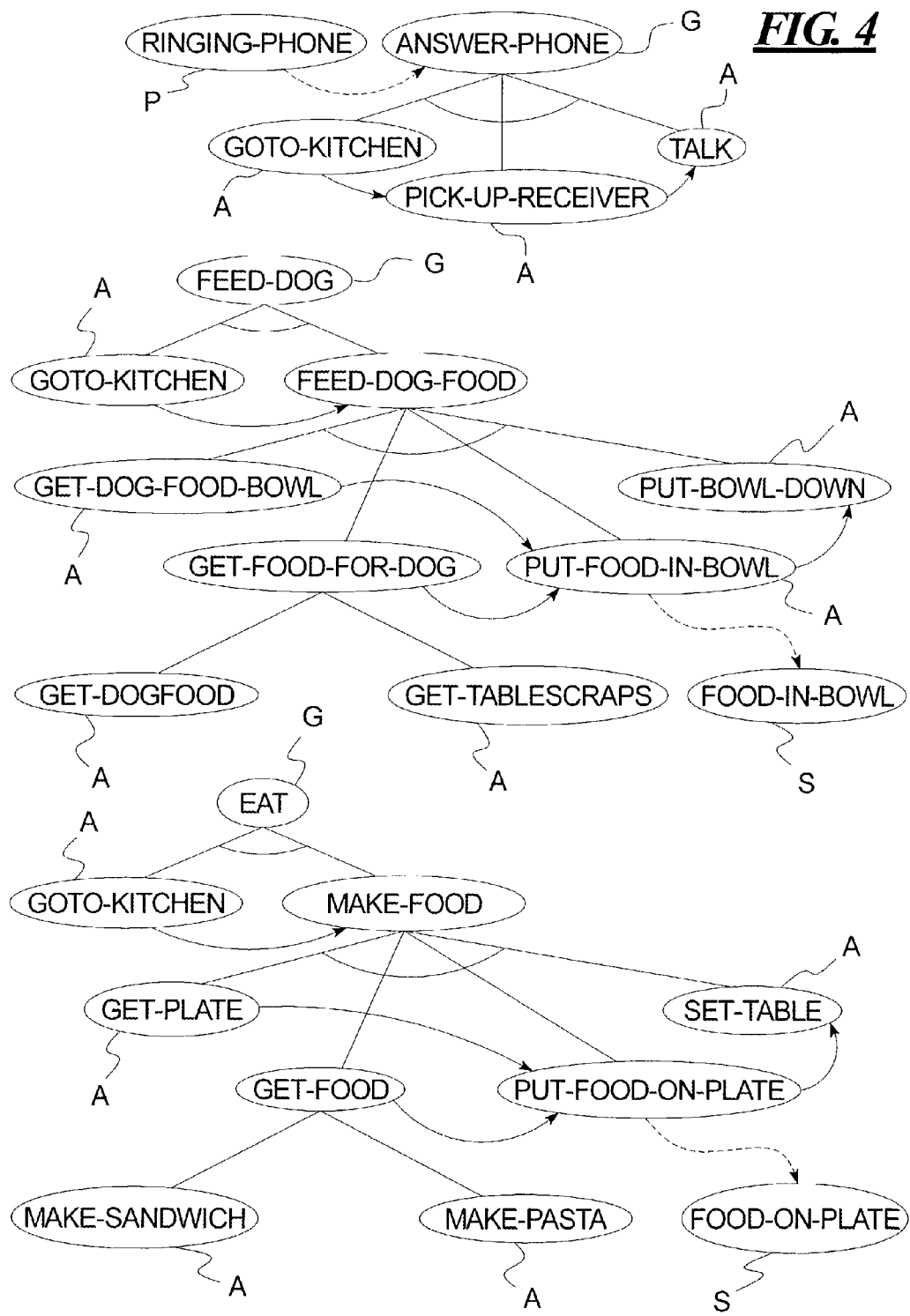
FIG. 4 is a diagrammatical illustration of an exemplary plan library useful in an in-home actor monitoring and response system environment.

Each tree defines a decomposition of the root goal into sequences of sub-actions that will achieve the root goal. With respect to the exemplary plan library of FIG. 4, such a decomposition is indicated by a straight solid line from the parent node to each of the children nodes. If all of the sub-actions must be done to achieve the parent goal, the parent goal is represented as an "and node" in the tree, and is illustrated in FIG. 4 by an arc crossing all of the links from the parent to the children. For example, the "Feed-dog-food" sub-goal requires that each of "Get-dog-food-bowl," "Get-food-for-dog," "Put-food-in-bowl" and "Put-bowl-down" occur for the action to be successful.

In many cases, the sub-steps of an "and node" must be done in a particular order. Ordering constraints between the actions are represented by directed arcs in the plan graph of FIG. 4. For example, in the "Answer-phone" plan definition, ordering constraints require that "Goto-kitchen" occur before "Pick-up-receiver", and that "Pick-up-receiver" occur before "Talk". Conversely, certain actions of a particular plan graph may not be ordered with respect to each other. For example, relative to the "Feed-dog" root goal, "Get-dog-food-bowl" or "Get-food-for-dog" can occur in any order, but both must occur before "Put-food-in-bowl".

A goal or sub-goal can also be defined by a set of possible expansions, such that any single expansion can be executed to achieve the goal. In this case, the actor/agent executing the plan would naturally or purposefully "choose" exactly one of the expansions. Such choice points in the plan definitions are indicated by "or nodes". With respect to the sample plan library of FIG. 4, an "or node" is illustrated by the absence of an "and arc" crossing the children's links to their parent node. For example, to achieve "Get-food-for-dog," the agent/actor need (or must) only execute one of "Get-dog food" or "get-tablescraps".

The definitions of plans are terminated in leaf nodes that represent "primitive actions" that are candidates for being observed in the domain (referenced in FIG. 4 as "A").

Where applicable, a particular plan tree may further include a state precondition ("P" in FIG. 4; e.g., "Ringing-phone" is a state precondition for the "Answer-phone" root goal) and/or a state change or an effect of actions ("S" in FIG. 4; e.g., "Food-in-bowl" is a state change for the "Feed-dog" root goal, and "Food-on-plate" is a state change for the "Eat" root goal). Connection between a state precondition or a state change and the corresponding plan graph is represented by a broken line in FIG. 4.

It will be recognized that the plan library provided in FIG. 4 is but one example of limitless goals, plans, and plan graphs. Depending upon the complexity of the skeptical system 12, the plan library can provide for countless possible goals each having multiple plans and extensive plan graphs. Contents of the plan library may be domain-specific, and the present invention is not limited to a daily living environment monitoring domain.

For example, the plan intent recognition 40 can be used in a computer security system domain and include information relating to goals such as stealing information from a computer or vandalizing web pages. An exemplary hierarchical plan library in diagrammatical form for a computer network security domain is provided in FIG. 5.

Figure 5:
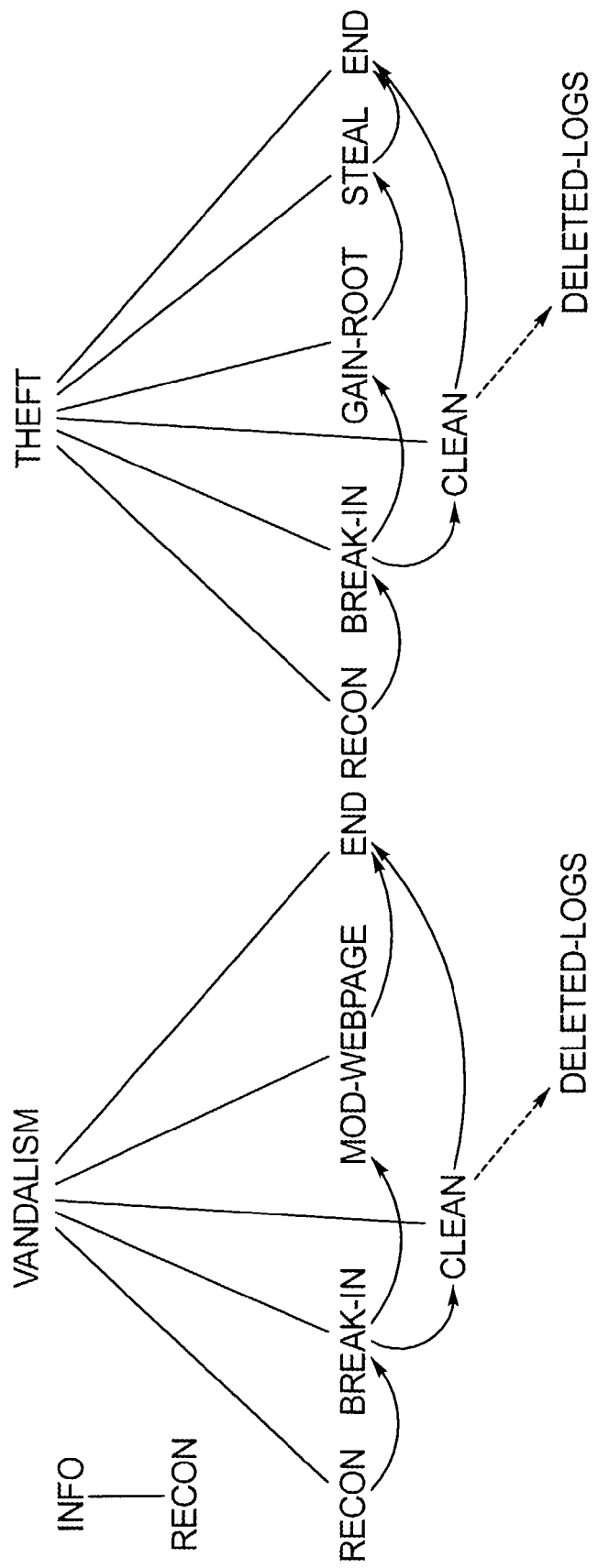
FIG. 5 illustrates another example of a simplified plan library that can be used to predict possible plans of an agent intruding into a simplified computer network.

As shown in FIG. 5, ff a hacker has a goal, such as stealing information from a computer, the plan library breaks that goal into five steps: scan the system to determine vulnerabilities (recon); exploit the system's weaknesses to gain entry (break-in); escalate privileges (gain root); export desired data (steal); and, hide traces of the hacker's presence on the computer (clean). As before, ordering constraints within a plan of the plan library are represented by directed arcs. For example, the hacker must execute a break-in before privileges can be escalated (gain root).

It should be noted that there is a condition/event pairing that is tied to the action "clean." The dashed line indicates this pairing and shows that a condition results from the execution of the action. Thus, if "clean" is an executed action, it will result in the condition of deleted event logs (deleted-logs). This information about action effects is necessary to infer the execution of unobserved actions.

Alternatively, the plan recognition module 40 can be used in industrial control applications such as oil refineries, with the related plan library including goal/plan graph information specific to the industrial installation.

Regardless of the exact contents of the plan library, the plan recognition module 40 is adapted to utilize goal/plan information from the plan library in conjunction with observed actions of the user 14 and/or with inputs from the a user classification and anomaly detection module 42 and the authentication module 44 to generate a set of execution traces that provide a basis for probabilistically indicating the most likely goal of the user 14. One probabilistic-based technique for performing this analysis is provided below.

In general terms, the plan recognition module 40 generates and records an observed action stream based upon the observed actions of the actor and/or the actor's environment. The observed action stream provides a sequential listing of observed actions. The observed action stream is then compared against the plan library, and potentially corresponding plan graphs (and thus corresponding goals) are selected. The selected plan graphs are then used as the basis for generating a set of explanations that each include the observed action stream and at least a portion of the selected activity plan graph.

Figure 6:
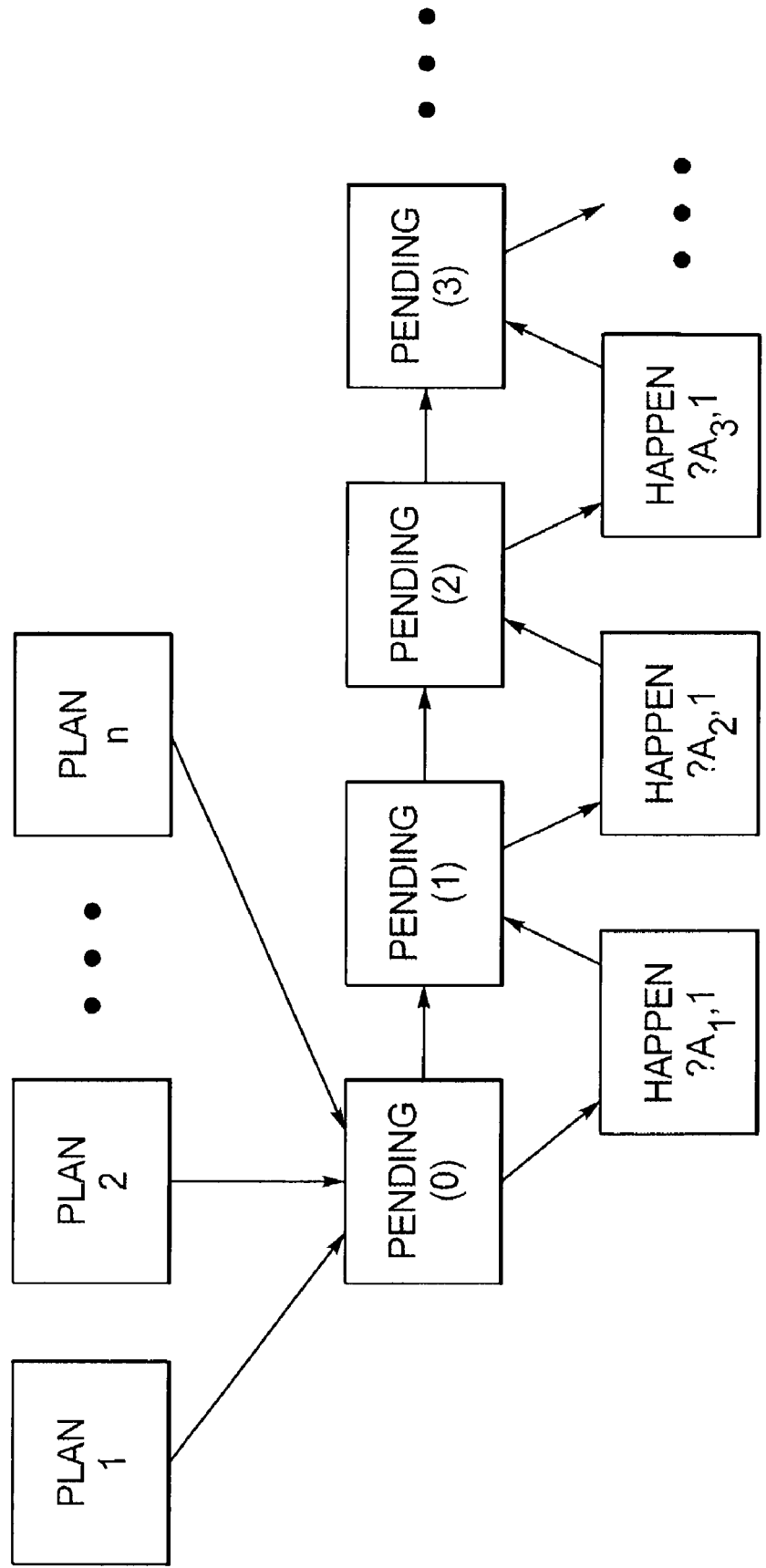
FIG. 6 illustrates the generation of pending sets of actions related to plans in the plan library.

One preferred model of plan recognition is described in the aforementioned Goldman, R. P., Geib, C., and Miller, C., "A New Model of Plan Recognition," *Conference on Uncertainty in Artificial Intelligence*, Stockhölm (July 1999), the teachings of which are incorporated herein by reference. In general terms, the preferred plan recognition model is based on the realization that plans are executed dynamically and that, at any given moment, the actor or agent is able to choose to execute any of the actions that have been enabled by the actor's or agent's previous actions. To formalize this slightly, initially the actor or agent has a set of goals and chooses a set of plans to execute to achieve these goals. The set of plans chosen determines the set of pending primitive actions. As the actor or agent continues engaging in a particular activity, the actor or agent will select and execute one of the pending actions, thereby generating a new set of pending actions from which further actions will be chosen. The new pending set is generated from the previous set by removing the action just executed and adding newly enabled actions. Actions become enabled when their required predecessors are completed. This process is illustrated in FIG. 6. To provide some intuition for the probabilistically-inclined, the sequence of pending sets can be seen as a Markov chain.

The above view of plan execution provides a simple conceptual model for the generation of execution traces. To use this model to perform probabilistic plan recognition, the preferred methodology hypothesizes a set of goals for the actor and utilizes the plan library to engage in forward simulation of the actor's hypothesized goals. This process only considers simulations that are consistent with the observed actions in the order in which they are observed. As part of the simulation, the actor's pending sets are generated to determine if one or more of the goals in the plan library are consistent with actual observations of actions of the actor and/or the actor's environment. The resulting combination of an execution trace, with consistent pending set(s) and hypothesized goal(s), is referred to as an "explanation" of what the actor may be doing/intending to do.

The above process is repeated with each action, varying the hypothesized goals and how the observed actions contribute to those goals, in order to generate the complete and encompassing set of all possible explanations for the observed actions. Since this set of explanations for the observations is generated to be exclusive and exhaustive, a probability distribution can be established over the set. Based upon this probability distribution, an evaluation can be performed to determine which of the hypothesized possible goals the user 14 is most likely pursuing.

In accordance with one model embodiment, computing the probability of a given root goal is a two-step process. First, the conditional probability of each explanation is established. Second, this conditional probability is used to compute the conditional probability of each of the root goals. In one implementation, the conditional probability of a specific explanation of a given set is determined by the following first equation:

$$P(\exp_1 obs) = \prod_{i=1}^{I} P(root_i) \cdot \prod_{j=1}^{J} \left(\frac{1}{|method_j|}\right) \cdot \prod_{k=1}^{K} \left(\frac{1}{|Pending\ Set_k|}\right)$$

where:
  $\exp_1$=the specific explanation or execution trace;
  obs=observed activity stream;
  I=total number of goals/root intentions in $\exp_1$;
  $root_i$=ith root goal/intent in $\exp_1$;
  $P(root_i)$=prior probability of $root_i$;
  J=number of choices of "or nodes" in $\exp_1$;
  $method_j$=jth choice/"or node" in $\exp_1$;
  $|method_j|$=number of alternative possible expansions for methods;
  K=|obs|;
  Pending $Set_k$=pending set at time k; and
  |Pending $Set_k$|=size of the pending set at time k.

The conditional probability for each root goal is generated by dividing the sum of the conditional probabilities of all the explanations that have the root goal by the sum of the conditional probabilities of all the explanations of the observations.

The above model is but one technique for probabilistically recognizing a plan or intent, and is in no way limiting to the present invention. Importantly, however, the one exemplary model, like all other available models, does not address the issue of unobserved actions. As described herein, the plan recognition module 40 extends the probabilistic model, whatever its form, to account for unobserved actions.

Regardless of the exact technique by which the execution traces are generated, analyzed, or otherwise utilized for generating further information from which a probabilistic evaluation can be performed, the plan recognition module 40 has the ability to consider not only directly observed actions of the user 14 based on the user commands, but also potentially unobserved actions or events as part of the execution trace generating process. In particular, the plan recognition module 40 is adapted to introduce and reason about unobserved actions within a probabilistic framework. For example, relative to the in-home monitoring and response system domain, instances of a particular sensor malfunctioning or otherwise failing to detect a particular activity will undoubtedly occur from time-to-time. Were the execution traces limited to activity plan graphs (and thus related goals) that only exactly matched (in terms of required primitive actions) the observed action stream, a sensor malfunction may result in a failure by the plan recognition module 40 to consider the correct plan (and thus related goal) in which the user 14 was engaged. Simply stated, it is not sufficient to simply assume that the observed action stream is complete. The plan recognition module 40 overcomes this deficiency by constructing a set of possible execution traces, inserting hypothesized unobserved actions to complete them.

One implementation of this process is to again use the plan library to engage in forward simulation of the observation stream. However, rather than using the observation stream as the sole determiner of which actions are executed next, a choice point is added. Instead of only considering explanations that account for the next action in the observed stream, the plan recognition module 40 considers explanations in which any listed action in the associated pending set is hypothesized as possibly having been done but not observed. This methodology still requires that all actions in the observation stream eventually become part of the explanation being considered. However, hypothesized, unobserved actions that are consistent with the pending set can be "inserted" into the explanation being considered. It is recognized that, in theory, unbounded insertion of hypothesized unobserved actions will result in a significant expansion of the space of possible or considered explanations. However, the plan recognition module 40 addresses this potential issue as described below.

With respect to the probabilistic intent recognition model described above, the generation of explanations that include unobserved actions entails determining the conditional probability of the explanations. As such, an additional term is added to the first equation to produce the following second equation:

$$P(\exp_1 obs) = \prod_{i=1}^{I} P(root_i) \cdot \prod_{j=1}^{J} \left(\frac{1}{|method_j|}\right) \cdot \prod_{k=1}^{K} \left(\frac{1}{|Pending\ Set_k|}\right) \cdot \prod_{l=1}^{L} P(unob_l)$$

where:
  $\exp_1$=the specific explanation or execution trace;
  obs=observed activity stream;
  I=total number of goals/root intentions in $\exp_1$;
  $root_i$=ith root goal/intent in $\exp_1$;
  $P(root_i)$=prior probability of $root_i$;
  J=number of choices of "or nodes" in $\exp_1$;
  $method_j$=jth choice/"or node" in $\exp_1$;
  $|method_j|$=number of alternative possible expansions for $method_j$;
  K=|number of actions (observed and unobserved) in the explanation|;
  |Pending $Set_k$|=size of the pending set at time k;
  L=number unobserved primitive actions in $\exp_1$;
  $unob_l$=1th unobserved leaf node or primitive action; and
  $P(unob_l)$=prior probability that $unob_l$ is executed and is not observed.

The methodology disclosed herein is preferably further adapted to include guidelines for terminating the consideration process. As a point of reference, other probabilistic intent recognition algorithms or models (that do not otherwise account for unobserved actions) are "terminated" when the complete set of observations are explained. Since the plan recognition module 40 adds unobserved actions, this termination criterion is no longer sufficient. Instead, the methodology disclosed herein determines the likelihood that various actions have been executed and were not observed to evaluate when to stop adding hypothesized unobserved actions to a proposed execution trace. In this regard, not all actions are equally likely to be executed without detection. Some actions are harder to hide than others. For example, the probability that a person could make a small change in the amount of air entering into their home undetected is much higher than the probability that they could successfully turn off the entire HVAC system of the home unnoticed. By capturing the probability that an action can be executed without observation, it is possible for the plan recognition module 40 to generate the probability of a sequence of actions being executed unobserved. In addition, the methodology disclosed herein bounds the probability of the unobserved actions with an explanation that the actor or user (or others associated with installation and operation of the plan recognition module 40) are willing to accept.

If no threshold were placed on the likelihood of unobserved actions, the process of inferring actions would proceed to successively more and more unlikely explanations by adding more and more unobserved actions. To prevent the generation of this infinite sequence of ever less likely explanations of the actor's intent/goal (via resultant execution traces), the plan recognition module 40 may be arranged to require a threshold probability value for the unobserved actions be provided. The execution traces are then constructed as previously described. For any execution trace including at least one hypothesized unobserved action, the likelihood of that unobserved action(s) being executed unnoticed is determined. If this determined likelihood is less than the pre-determined threshold value, the execution trace is eliminated from further consideration. In effect, the plan recognition module 40 allows the user (or others) to specify how unlikely an explanation they are willing to accept, and then use this bound to limit the unobserved actions that are added to the execution trace. Alternatively, a more straightforward fixed or known upper bound on the number of unobserved actions that can be inserted into any particular execution trace can be provided.

In order to bound the unobserved actions, the last term of the second equation is critical, and a running total is maintained for this term. Given the probability threshold value (T) (selected and entered by the user), and an acceptable execution trace, the hypothesized execution trace must satisfy the following third equation:

$$T \leq \prod_{l=1}^{L} P(unob_l) \text{ if } L > 0$$

Figure 7:
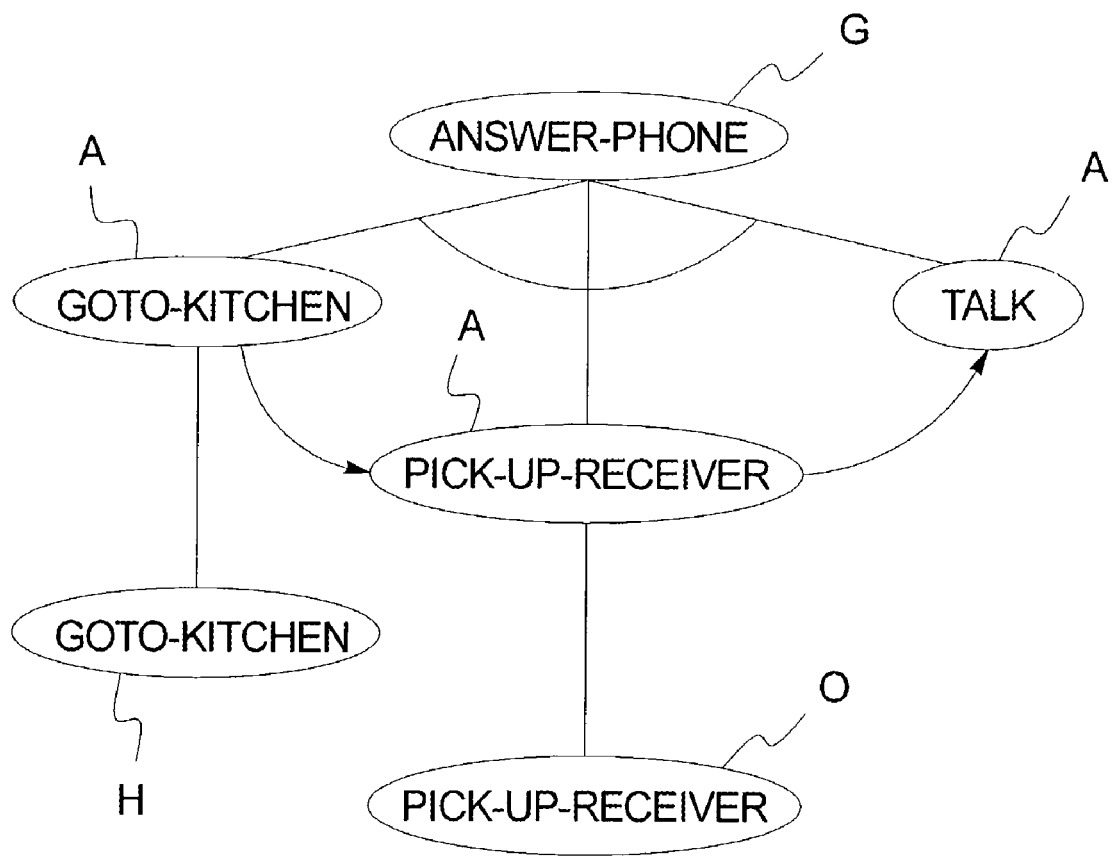
FIG. 7 is a diagrammatical illustration of an exemplary execution trace generated by the plan recognition methodology implemented by the plan recognition module of FIG. 3.

To better illustrate the effect of considering unobserved actions, reference is made to the plan library of FIG. 4. Relative to this plan library, where an observed action stream is found to be ["Pick-up-receiver"], if unobserved actions were not accounted for, the "Answer-phone goal" would not be considered (nor would the "Feed-dog" or the "Eat" goals) since the observed action stream does not include "Goto-kitchen". However, by hypothesizing that "Goto-kitchen" was unobserved and inserting it into the corresponding execution trace (e.g., ["Goto-kitchen", "Pick-up-receiver"]), the "Answer-phone" goal would be considered as part of the probabilistic plan evaluation. This relationship is shown diagrammatically in FIG. 7, with the observed event of "Pick-up-receiver" designated by "0" and the hypothesized, unobserved event of "Goto-kitchen" denoted as "H".

Although the above example is highly simplistic, it is recognized that simply assuming that every possible action was unobserved will significantly expand the search space. The plan recognition module 40 prunes this space through ordering constraints provided by the observations. In particular, if a plan graph (possibly containing more than a single root goal and associated plans), does not contain all of the observed actions of the observed action stream, or if the observed action stream does not obey the ordering constraints imposed by the plan graph, that particular plan graph can be filtered from consideration and not be used as a basis for an execution trace.

Figure 8:
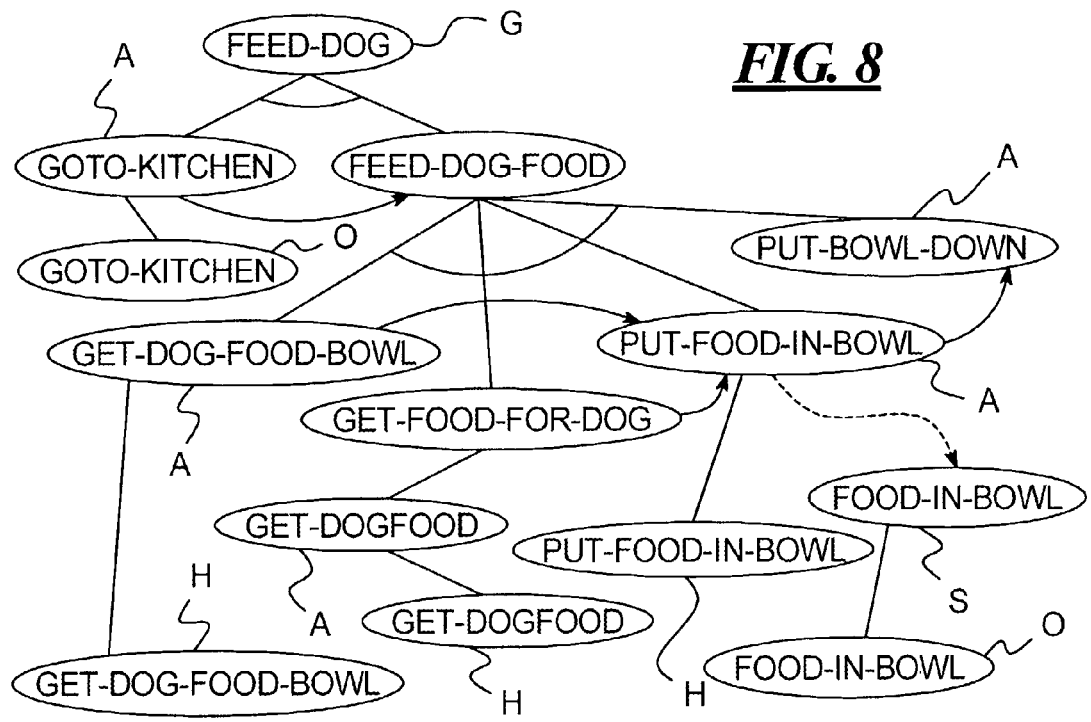
FIG. 8 is a diagrammatical illustration of exemplary execution traces generated by the plan recognition methodology described herein.
Figure 8:
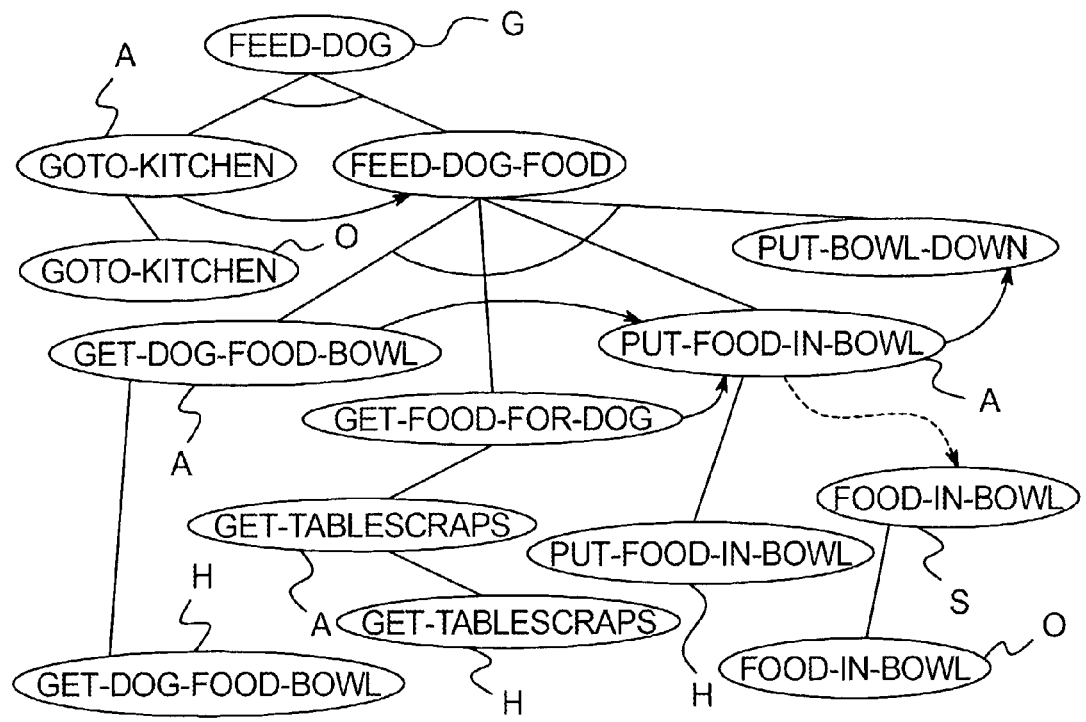

Additionally, unobserved actions can be inferred from state changes. In particular, while a particular sensor of the control system 16 may fail to detect performance of an action, the resulting effects of that action can still be "observed" by other sensors of the control system 16. Thus, a reported state change can provide evidence or otherwise indicate occurrence of unobserved action(s) that would give rise to the reported desired effect. From them, it can be inferred that the action must have occurred before the report of the state change. Reports of a state change can also simply provide confirming information about a previously observed action. For example, and referring to the plan library of FIG. 4, consider an observed action stream of ["Goto-kitchen", "Food-in-bowl"]. A report of "Food-in-bowl" (or state change) implies that "Put-food-in-bowl", "Get-dog-food-bowl", and one of "Get-dog-food" or "Get-tablescraps" have occurred unobserved. Further, the ordering constraints in the plan library imply that they must fall between execution of "Goto-kitchen" and "Food-in-bowl". Thus, state change reports give more information about the execution traces that are consistent with the observation. As a point of further explanation, FIG. 8 illustrates in diagrammatical form the possible execution traces resulting from the above example, with observed actions being denoted as "0" and inserted, hypothesized unobserved actions identified as "H".

In an embodiment of the present invention, the plan recognition module 40 is adapted to perform the state change processing based upon an assumption that there is only a single report for a given state change. This feature obviates potential processing complications whereby multiple sensors each reporting the same state change will not cause the plan recognition module 40 to believe that the given proposition has changed state more than once. Essentially, "chattering" sensors that would otherwise produce multiple reports of the same state change are filtered In addition, the possible execution traces that otherwise include at least one hypothesized unobserved action are also filtered to be consistent with the unobserved actions that are implied by unenabled actions. In this regard, an "unenabled action" is one that is observed but where the actions that the plan library specifies must come before it were not first observed. For example, considering again the plan library provided in FIG. 4, and in particular the "Feed-dog" and "Eat" root goals, where an observed action stream of ["Get-dog food", "Make-sandwich"] is observed, it can be concluded that these actions are members of disjoint plans; that is, no single root goal will explain both of these actions.

However, these actions are even more informative since they are both unenabled by the observed actions. With respect to this hypothetical observed action stream, the plan library of FIG. 4 specifies that "Goto-kitchen" must occur before "Get-dog-food" and "Make-sandwich". Therefore, in order to explain these two observations, it can be hypothesized that "Goto-kitchen" has been executed unobserved. Thus, these two actions provide evidence of two distinct plans: ["Goto-kitchen", "Get-dog-food"] and ["Goto-kitchen", "Make-sandwich"].

Unenabled actions provide more information for use in reconstructing the actor's actual actions than other observations. They require that the action itself be in the sequence, but they also provide evidence of unobserved actions. Relative to the generation of execution traces based upon the above example, the set of observations can allow pruning of any execution sequence or trace that does not contain "Get-dog-food", followed sometime later by an "Make-sandwich", but it also dictates that any execution trace that does not have "Goto-kitchen" preceding "Get-dog-food" should be ignored. These unenabled actions are very important pieces of information when attempting to infer the plans of the actor.

The above described algorithm for probabilistically accounting for unobserved actions in the context of automated intent or goal recognition overcomes problems identified with previous intent recognition methodologies. The execution traces generated by the plan recognition module 40 can be analyzed in a number of different manners (one specific example of which is provided below). However, considering hypothesized unobserved actions as a part of the execution trace generation process, and in conjunction with the threshold bound, will allow the plan recognition module 40 to handle domains that are otherwise too complex for existing methodologies.

As previously described, the set of execution traces generated by the above algorithm (that otherwise were probabilistically deemed acceptable), includes one or more hypothesized unobserved actions, and are utilized by the plan recognition module 40 to probabilistically recognize or estimate an intention or goal of the actor or agent depending upon the particular domain application.

Figure 9A:
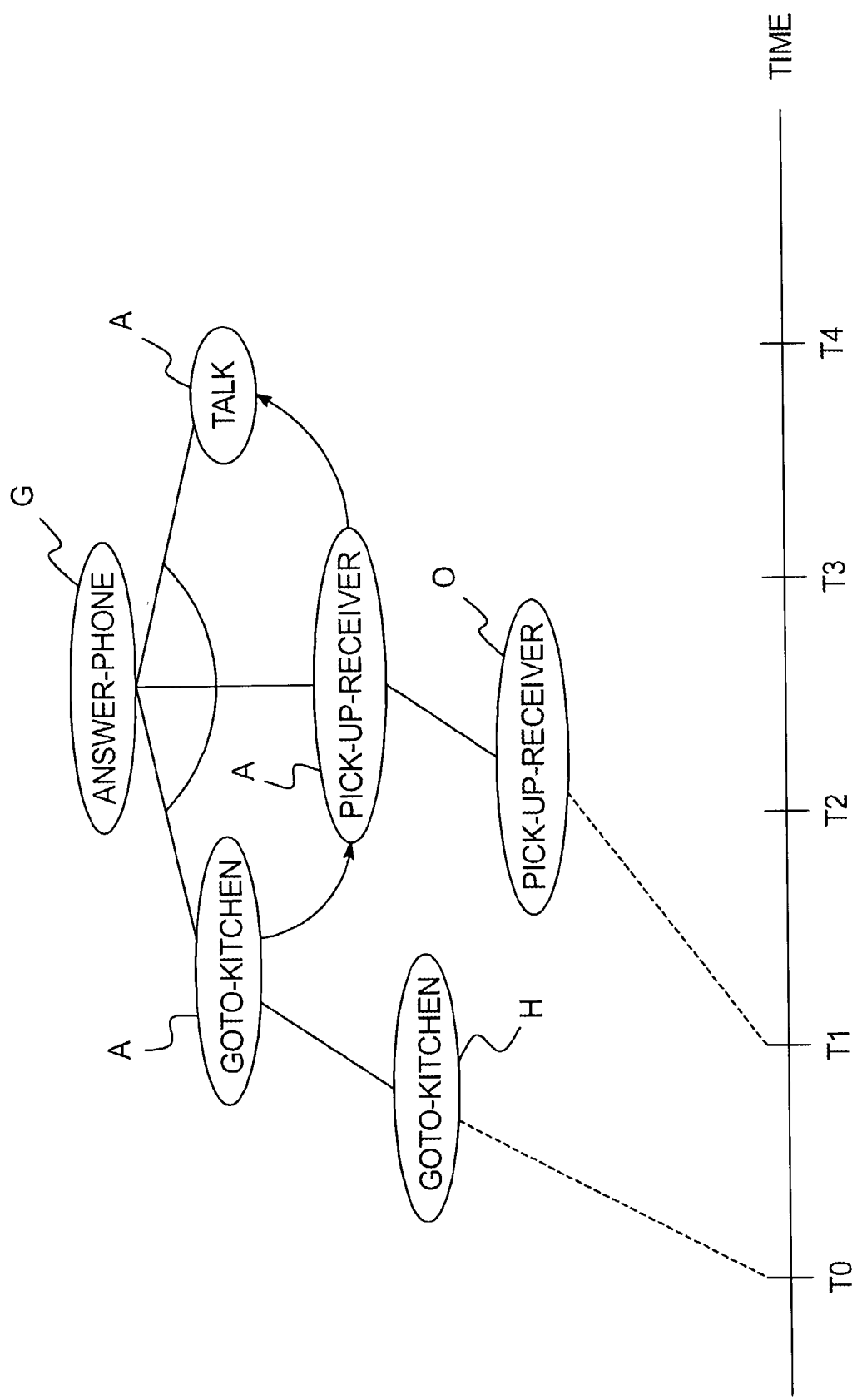
FIGS. 9A-9G are diagrammatical illustrations of possible goal explanations generated by the plan recognition module of FIG. 3 in accordance with a hypothetical observed event.
Figure 9B:
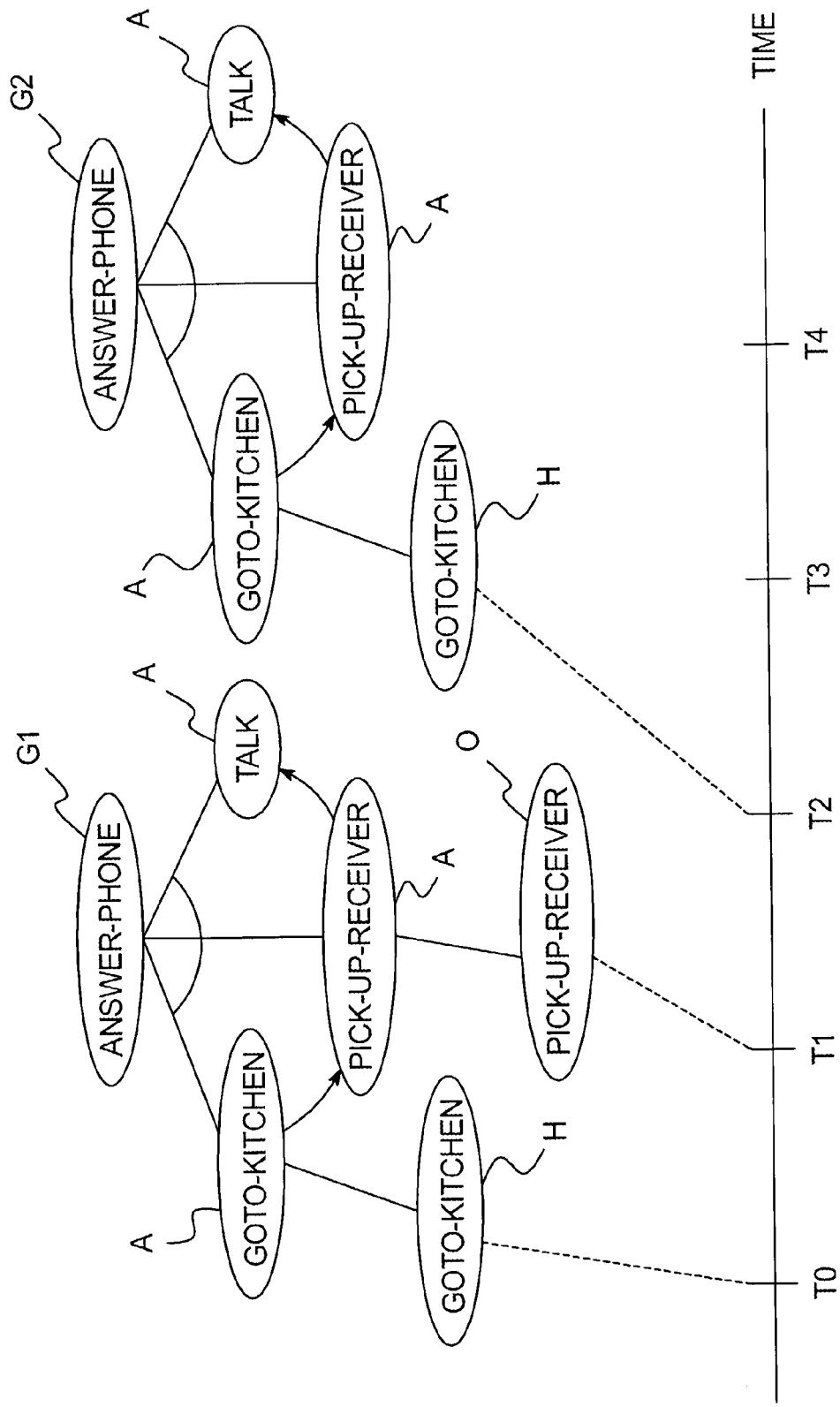
Figure 9C:
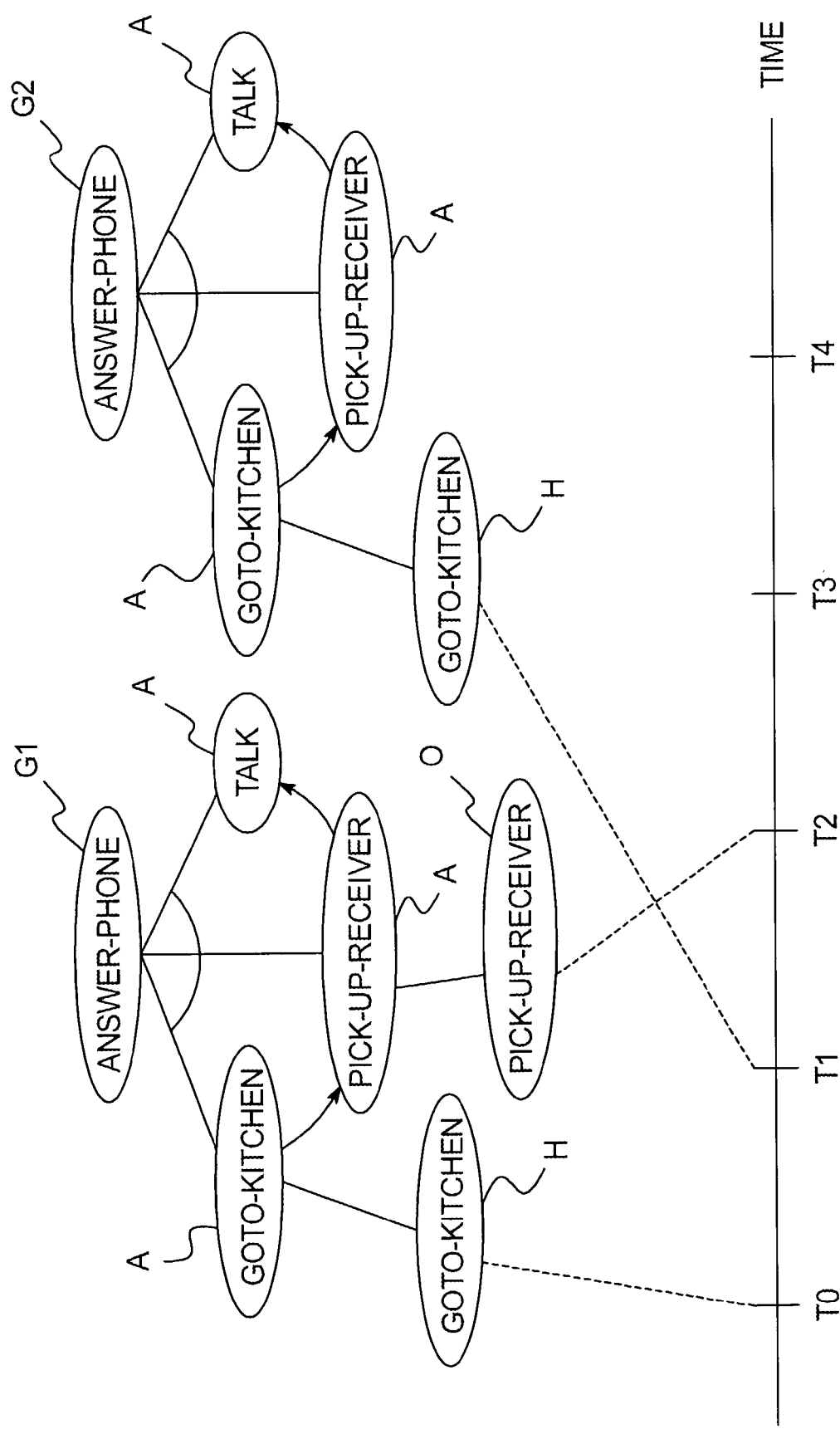

With continued reference to the plan library of FIG. 4, a hypothetical observation stream may consist of a single ["Pick-up-receiver"] event. Assuming a set threshold limit sufficient to allow two unobserved "Goto-Kitchen" events but no others, the single "Pick-up-receiver" observation would result in seven possible explanations or execution traces, shown diagrammatically in FIGS. 9A-9G. FIG. 9A illustrates a first possible explanation of a single "Answer-phone" goal dictated by "Goto-kitchen" being unobserved at time T0 followed by the observed "Pick-up-receiver" at time T1. FIG. 9B illustrates a second possible explanation characterized by two "Answer-phone" goals, one ("G1") dictated by "Goto-kitchen" unobserved at time T0 followed by the observed "Pick-up-receiver" at time T1; the other "Answer-phone" goal ("G2") dictated by a hypothesized, unobserved "Goto-kitchen" at time T2. FIG. 9C illustrates a third possible explanation again characterized by two "Answer-phone" goals. However, unlike the second possible explanation, the first goal ("G1") of the third possible explanation are supported by "Goto-kitchen" being unobserved at time T0 and the observed "Pick-up-receiver" at time T2; the other "Answer-phone goal ("G2") is supported by "Goto-kitchen" observed at time T1.

Figure 9D:
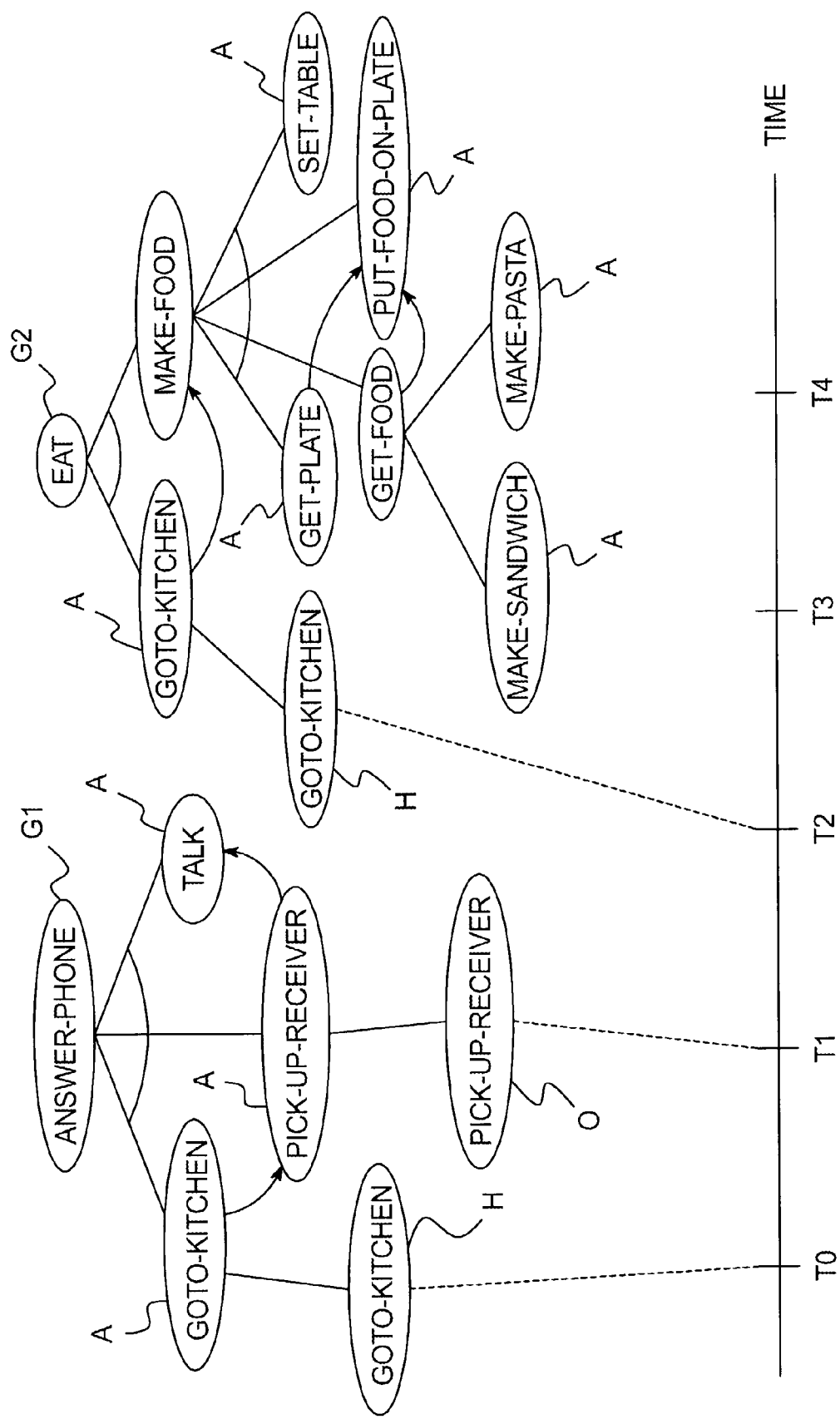
Figure 9E:
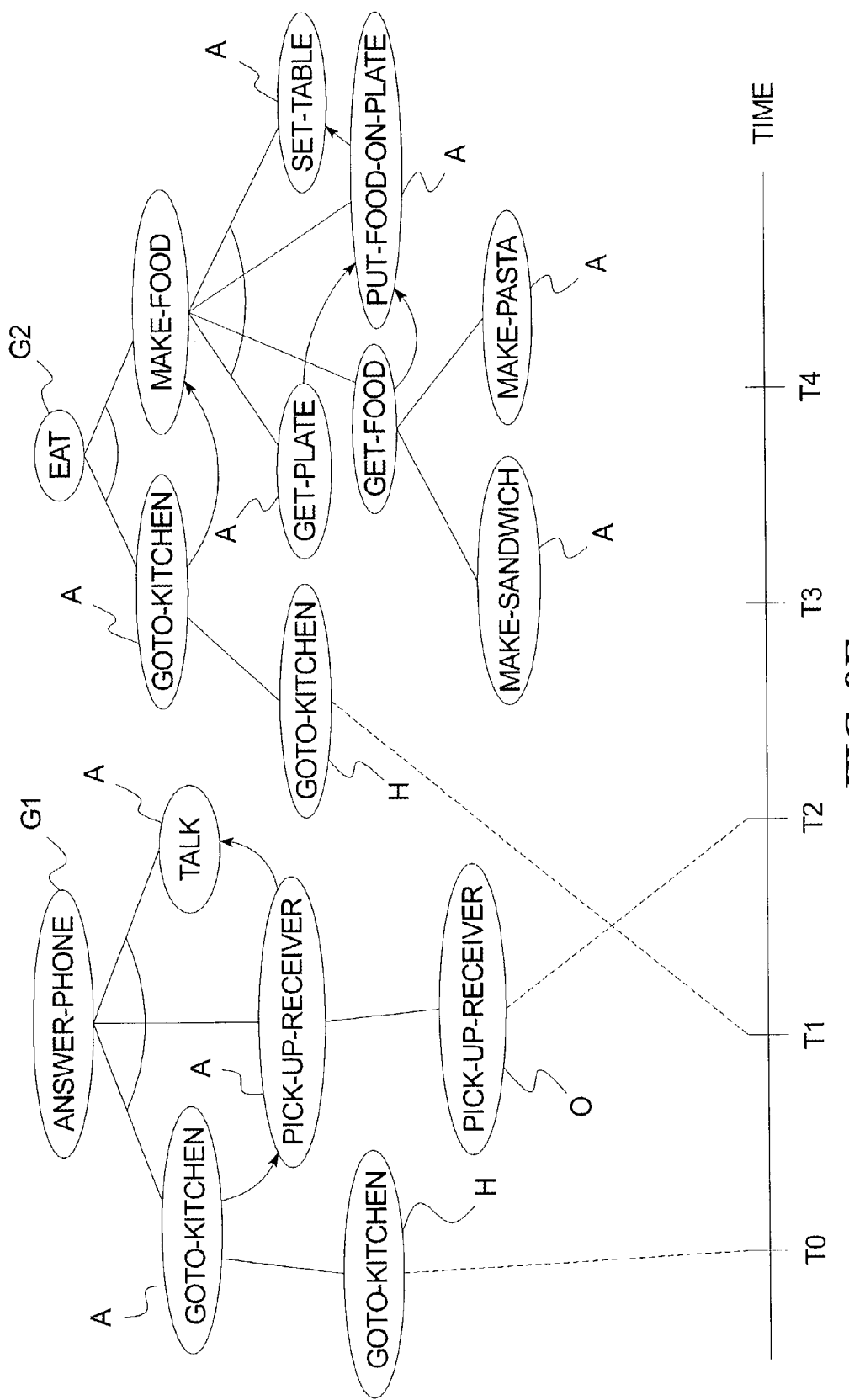

A fourth possible explanation, characterized by one "Answer-phone" goal ("G1") and one "Eat" goal ("G2"), is shown in FIG. 9D. The "Answer-phone" goal is supported by the unobserved "Goto-kitchen" at time T0 followed by the observed "Pick-up-receiver" at time T1; the "Eat" goal is dictated by hypothesizing that "Goto-kitchen" was unobserved at time T2. A fifth explanation, illustrated in FIG. 9E, is similar to the explanation of FIG. 9D in that it includes an "Answer-phone" goal ("G1") and an "Eat" goal ("G2"). However, the ordering of unobserved actions varies (accounting for the possibility that the actor may decide to eat before answering the phone). In particular, the "Answer-phone" goal of FIG. 9E is supported by "Goto-kitchen" unobserved at time T0 and the observed "Pick-up-receiver" at time T2; the "Eat" goal is supported by hypothesizing that "Goto-kitchen" occurred unobserved at time T1.

Figure 9F:
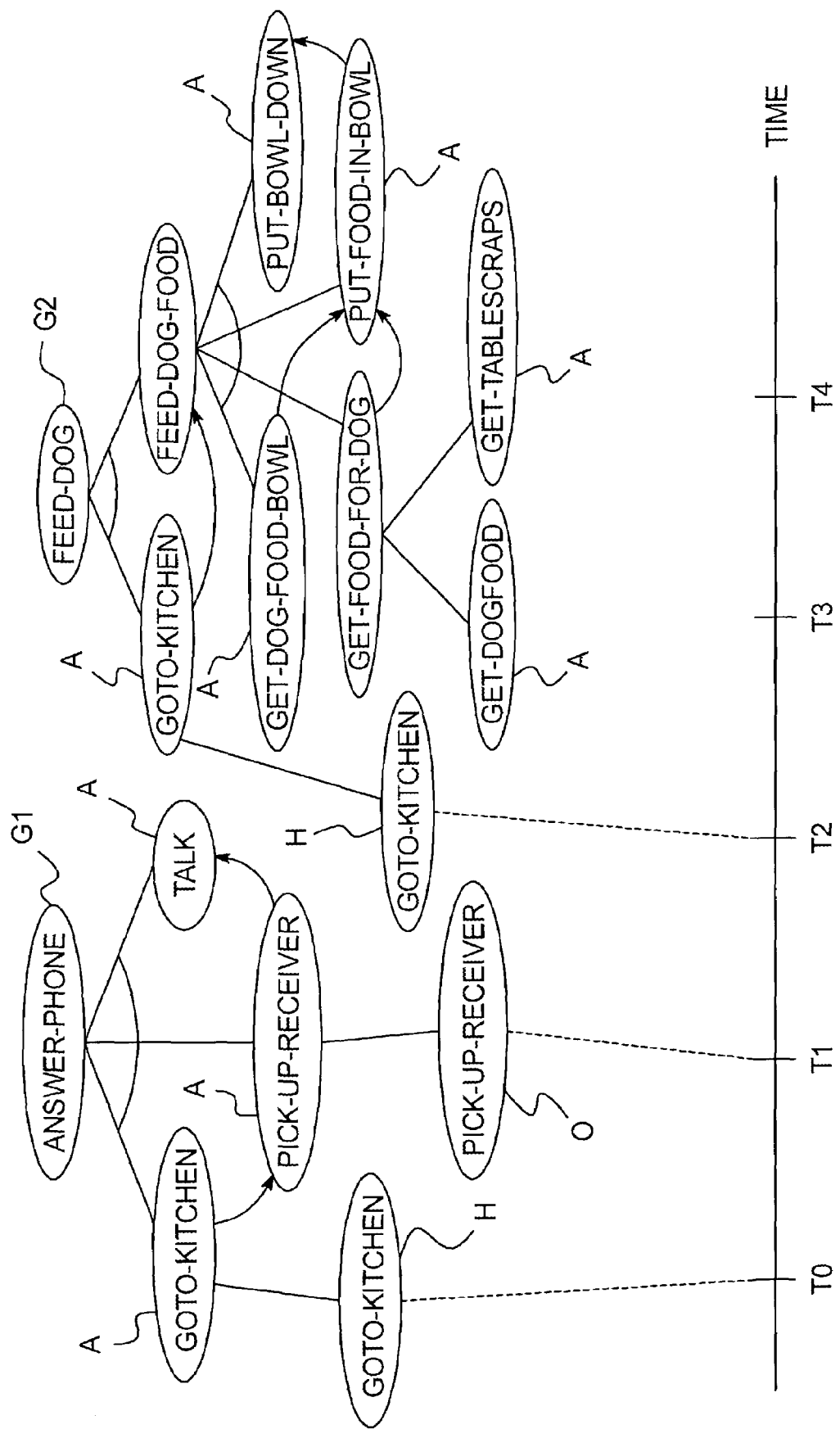
Figure 9G:
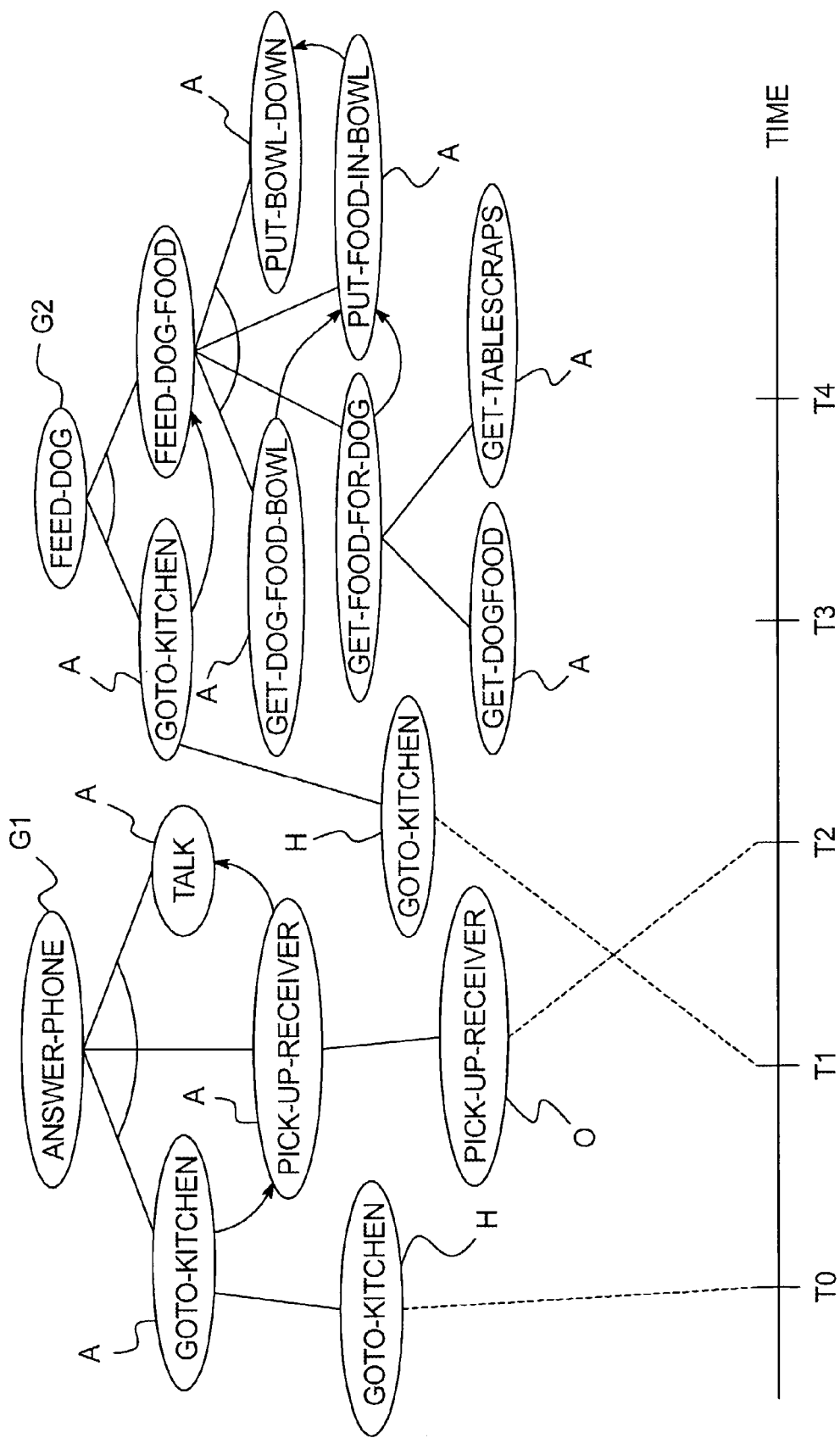

FIG. 9F illustrates a sixth possible explanation that includes the goals of "Answer-phone" ("G1") and "Feed-dog" ("G2"). The "Answer-phone" goal is explained by hypothesizing that "Goto-kitchen" was observed at time T0 followed by the observed "Pick-up-receiver" at time T1; the "Feed-dog" goal is supported by hypothesizing that "Goto-kitchen" was unobserved at time T2. Conversely, the ordering of the "Answer-phone" and "Feed-dog" goals can be reversed, as reflected in the seventh possible explanation of FIG. 7G. In particular, the "Answer-phone" goal ("G1") is supported by hypothesizing an unobserved occurrence of "Goto-kitchen" at time T0 followed by the observed "Pick-up-receiver" event at time T2; the "Feed-dog" goal ("G2") of the seventh explanation is supported by hypothesizing an unobserved "Goto-kitchen" event at time T1.

It will be recognized that the above-described probabilistic methodology for recognizing a goal of an actor is but one available technique. Other probabilistic-based frameworks can also be applied. Regardless of the exact approach, however, the plan recognition module 40 incorporates the ability to extend the observed sequence of actions with hypothesized unobserved actions consistent with the observed actions, observed state changes, and the plan graphs to create a set of possible execution traces.

The resulting execution traces are then used as the basis for the probabilistic evaluation, such as that described above (e.g., the set of execution traces are used to construct pending sets and then the probability distribution over the sets of hypotheses of goals and plans implicated by each of the traces and pending sets). The resulting information generated by the plan recognition module 40 can then be used by or with the threat assessment module 46 in evaluating the current situation and needs of the user 14, as well as to formulate appropriate responses in conjunction with the response planning module 48.

It should be noted that, in this discussion, it has been implicitly assumed that the agent can perform any action without detection. However, in practice, this assumption is not universally true. The execution of some actions is simply harder to hide than the execution of others. For example, the probability that a person can conduct a port scan of a machine without knowledge of the machine's authorized user is much higher than the probability that the person can successfully carry out a denial-of-service attack against the machine without the notice. In this framework, it is trivial to add probabilities about the likelihood of an agent performing a specific undetected action.

Often, when it is possible to prevent an observer from seeing the performance of an action, it is not possible to prevent the observation of the action's effects. In the case of weapons testing, while a nation might be able to covertly build a nuclear device, testing such a device is hard to hide. In the network security domain of FIG. 2, consider the "clean" action. The execution of the action itself might be hidden, but deleting logs is very visible.

To summarize, hostile agents can be handled by extending the observed sequence of actions with hypothesized unobserved actions consistent with the observed actions, the observed state changes, and the plan graph in order to create a set of possible execution traces. The set of execution traces are used to construct the pending sets, and then the probability distribution over the sets of hypotheses of goals and plans implicated by each of the traces and pending sets is produced.

In the implementation of the plan recognition algorithm as described above, two assumptions about the observation stream have been made. There is a fixed and known upper bound on the number of unobserved actions, and the given observations are true and correctly ordered. Neither of these assumptions is strictly necessary.

Bounding the number of possible unobserved actions enables reasoning about where the agent could be in the execution of its plans. Suppose the number of unobserved actions is bounded at two, and a break-in action is observed (FIG. 5). This observation is not consistent with the agent having already executed a steal action. One action has been observed, and the agent may have executed two more unobserved actions. Thus, the agent can have executed a total of three actions. Since steal is the fourth step in its plan, the agent could not yet have executed it.

This bound can be removed from the plan recognition algorithm in a number of ways, including running the plan recognition algorithm multiple times with increasing bounds, or replacing the bound with a probability distribution over the number of unobserved actions and weighing the execution traces accordingly.

The other assumption as discussed above is that the observed actions happened and in the order indicated by the sequence. Thus, there is a sequence of three observations, recon, break-in, and gain-root. It is observed that recon happened before break-in which happened before gain-root. The observation sequences are not assumed to be complete. Therefore, it cannot be concluded that clean did not happen between break-in and gain-root, or even after gain-root. However, ordering constraints provided by the plan library allow some possibilities to be ruled out. For example, the ordering constraints allow the conclusion that, if clean did occur unobserved, it could not have occurred before the break-in unless there were an earlier unobserved break-in.

This assumption means that the validity of observations need not be questioned. However, in environments with hostile agents, this assumption should not be made. Consider a military example. If there is a report of troops massing at a particular location, the validity of the report must first be determined before considering the effect that this action would have on an assessment of the enemy's goals. It is, however, straightforward to complicate the model by including a traditional model of noisy observations.

As yet another example, the skeptical system can be arranged to reason about how a protected asset will respond to user commands. Also, the skeptical system should implement a response to any of the above that is commensurate with the changing security situation. The responses of a skeptical system should preferably include hedging, they should preferably include slack to account for uncertainty, and they should preferably weigh the worst case of an intelligent adversary attempting to counter them.

The user classification and anomaly detection module 42 continuously monitors the user actions in order to identify and classify the user 52 based on a learned pattern of actions characterizing the user 52 and based on anomalies in the way the user 52 uses the protected asset. As discussed above, users have typing and pointing styles that involve such characteristics as typing rate, typing rhythm, typing errors, click rate, click rhythm, click errors etc. Also as discussed above, users have certain patterns of interaction with computers (such as the order in which applications are usually accessed) that the user classification and anomaly detection module 42 can learn and associate with the corresponding users. The user classification and anomaly detection module 42 uses these and other patterns and anomalies in order to identify and classify the user 52 and supplies this information to the threat assessment module 46.

The user classification and anomaly detection module 42 may implement statistical techniques in characterizing and identifying the user 52. Thus, the user classification and anomaly detection module 42 can maintain a continuously updated probability distribution over the space of known users during a session. Because the actions of the user 52 may apply unequally to the learned characteristics of plural users, the user classification and anomaly detection module 42 can assign a probability that the user 52 is each of the users stored in a user library of the memory 38. The user classification and anomaly detection module 42, therefore, supplies both the identifications and the corresponding probabilities to the threat assessment module 46. The threat assessment module 46 can combine this information with information from the authentication module in making a more positive identification. Alternatively, only the identification of the user having the highest probability need be supplied to the threat assessment module 46. The user classification and anomaly detection module 42 can also supply information to the effect that the user 52 is not a known user, i.e., a user stored in a user library.

The authentication module 44 implements passive biometrics to identify the user 52 and supplies this identification to the threat assessment module 46. As discussed above, such passive biometrics, for example, can include face recognition identification, fingerprint identification, voice recognition identification, and/or stress detection through acoustic, visual and/or infrared sensing. Passive biometrics may also include retina and/or iris scans. Additionally or alternatively, active recognition may be employed by the authentication module 44. For example, the authentication module 44 may direct the user 52 to enter a pass word, a personal identification number, personal information, a fingerprint through use of a peripheral device, a signature, hand geometry, etc. Such direction may be random, periodic, and/or directed by the skeptical system 12 such as when the skeptical system 12 determines that the user 52 is suspicious.

One of the reasons to rely on both the user classification and anomaly detection module 42 and the authentication module 44 is to increase the probability of identifying the user 52. An agent with hostile intent can either coerce an authorized user to enter the authorized user's correct identity or use artificial means to trick the authentication module 44 into believing that the authorized user is entering commands when, in fact, it is the hostile agent.

Figure 10:
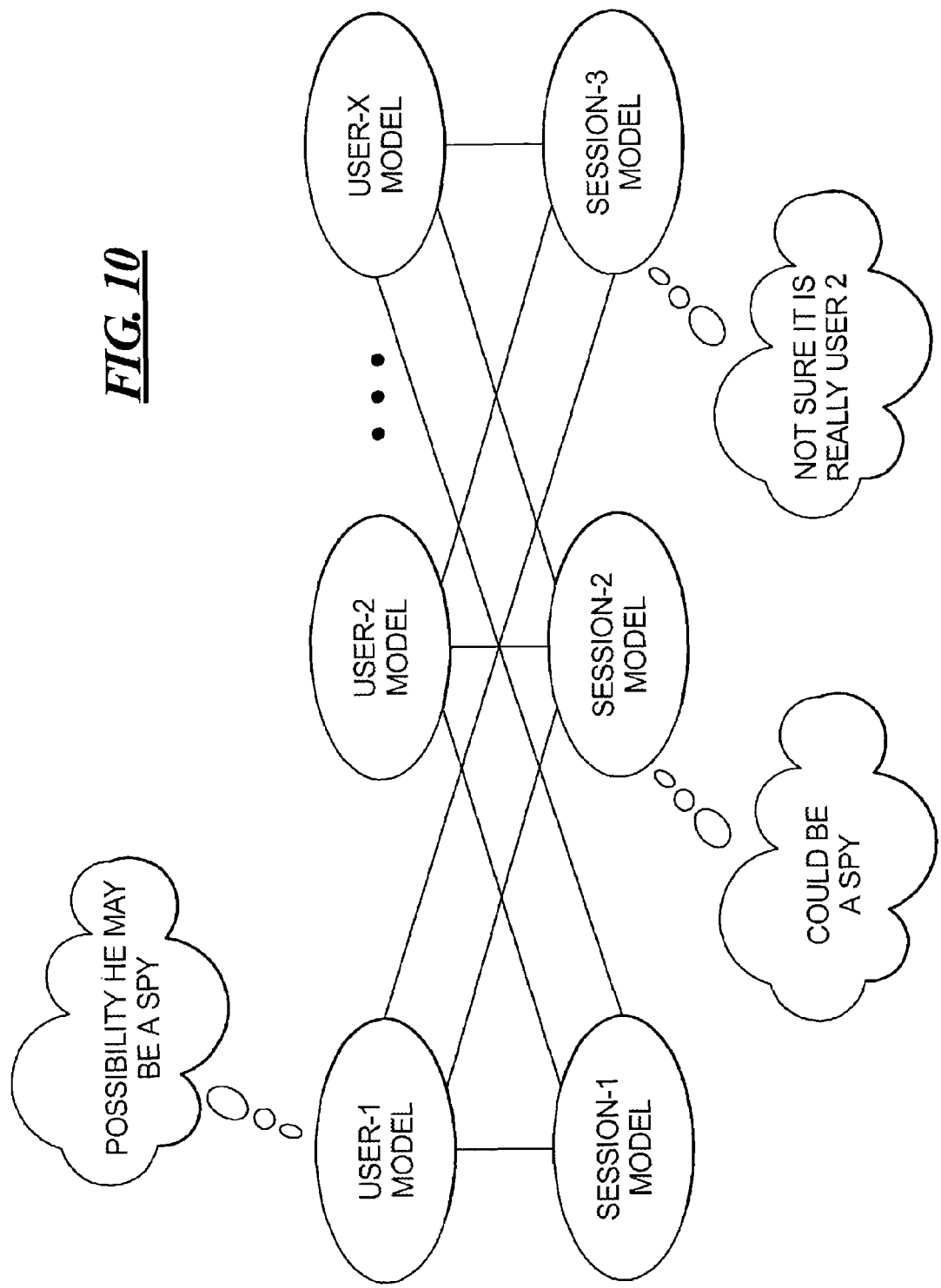
FIG. 10 illustrates user models, session models, and/or cost models maintained by the threat assessment module of FIG. 3; and, FIG. 11 provides an example of a session model maintained by the threat assessment module of FIG. 3.

As shown in FIG. 10, the threat assessment module 46 uses the plan predicted by the plan recognition module 40, the identity and/or classification of the user 52 from the user classification and anomaly detection module 42, and the identification from the authentication module 44 in order to create user models, session models, and/or cost models.

The user models establish the odds that a given user has a particular primary motivation such as authorized use, spying, sabotage, etc. The user models may also act as placeholders for unknown users who may be present. Further, the user models are maintained over sessions. In other words, the user models are maintained permanently and/or semi-permanently, and are updated during each session.

The session models provide estimates of whether the plans of the user are normal or hostile. The threat assessment module 46 may render each session model as a Bayesian belief network. Session models relate one or more users in a probabilistic fashion because the identity of a user may not be known with certainty due to the possibility of spoofing by a knowledgeable insider that cannot be dismissed without continuous intrusive authentication. The threat assessment module 46 may be arranged to use the session models to periodically update the user models. That is, a session that is seen as spying may make a particular user more likely to be suspected of being a spy.

Figure 11:
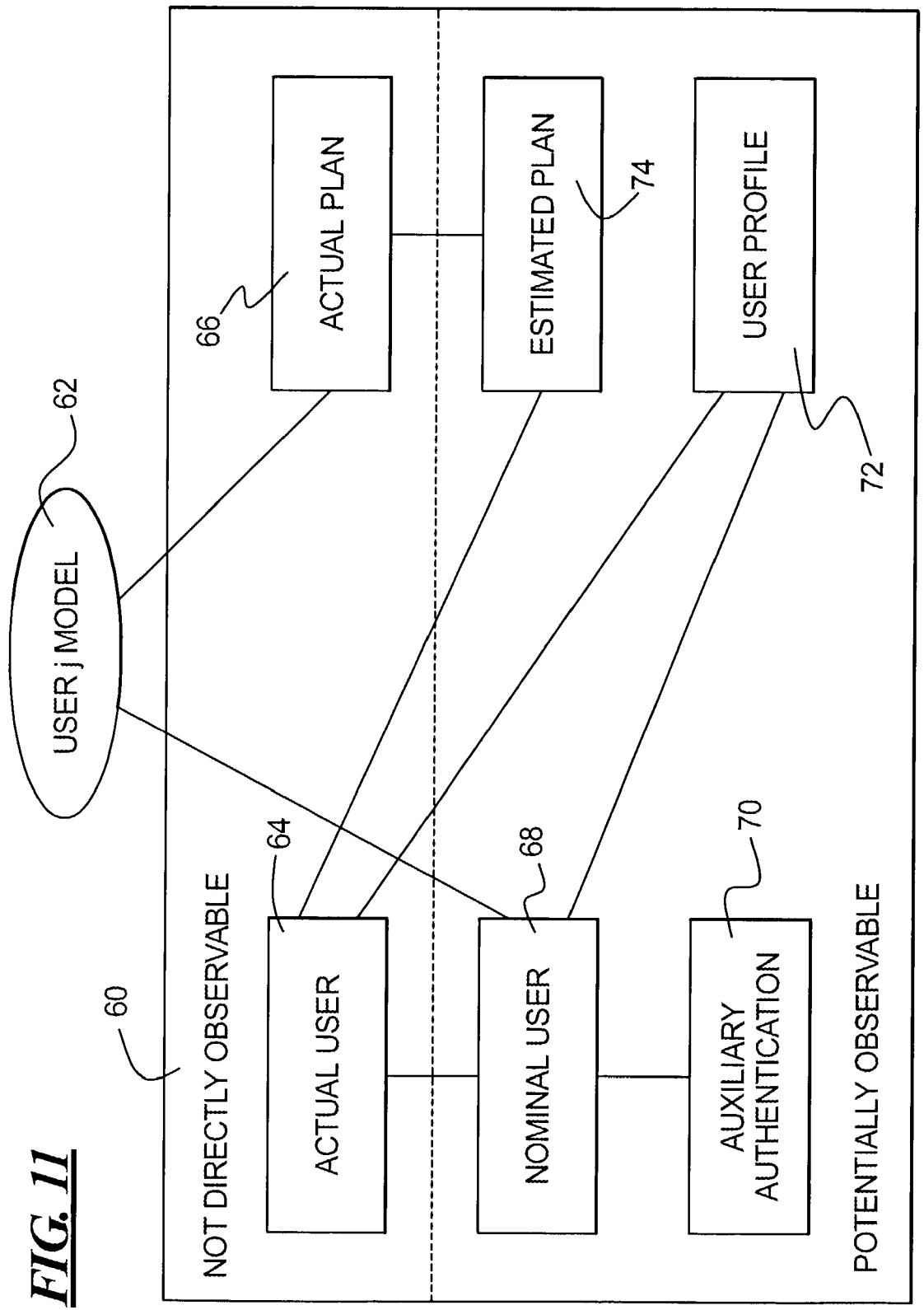

FIG. 11 provides an example of a session model 60 that is associated with a user model 62 for user j. The session model 60 is an example of a Bayesian belief network. The actual user 64 and the actual plan 66 are assumed to be not directly observable and, therefore, must be inferred. However, the session model 60 for session i maintained by the threat assessment module 46 can observe a nominal user identity 68 as provided by the authentication module 44 and as supported by an auxiliary authentication 70 provided by an auxiliary system and as supported by a user profile 72 provided by the user classification and anomaly detection module 42. The auxiliary authentication 70 may use biometrics, a token in the possession of the user, or on some shared secret or other knowledge in the user's possession to support identification of a user, whereas primary authentication is based on a password. The threat assessment module 46 for the session 60 may infer the actual user 64 from the nominal user identity 68 and from a predicted plan 74 provided by the plan recognition module 40. Moreover, the threat assessment module 46 may infer the actual plan 66 from the predicted plan 74 provided by the plan recognition module 40.

The cost model is useful in determining an appropriate response to the threat as assessed by the threat assessment module 46. The cost model is a model of the cost that is likely to result from the intended plan predicted by the plan recognition module 40. Costs may be stored in the memory 38 for each of the plans stored in the plan library and may be accessed from the memory 38 based on the intended plan provided by the plan recognition module 40.

The threat assessment module 46 determines the threat dependent upon the user identity, the estimated plan, and the cost associated with the estimated plan. For example, the memory 38 may store threat assessments as a function of the estimated plan, the cost resulting from execution of the plan, and the class of and/or identity of the user currently issuing commands. The threat assessment module 46 then accesses a particular one of the stored threat assessments using the estimated plan, the cost resulting from execution of the plan, and the class of and/or identity of the user currently issuing commands as an address into the memory 38 and passes its threat assessment to the response planning module 48.

The response planning module 48 maintains a response model that models the likely effectiveness of various responses to the threat assessments provided by the threat assessment module 46. The following are responses that can be implemented by the response planning module 48 based on the threat assessment from the threat assessment module 46. The commands of the user 52 can be simply passed to the protected assets 50 because there is no substantial threat (PASS). The commands of the user 52 can be logged for later supervisory review because the threat is low (LOG). The commands of the user 52 can be delayed which is a useful strategy in some denial-of-service (DoS) situations such as where hackers attempt to deny users service by overloading the Internet or a web site (DELAY). The user 52 may be required to re-submit proof in order to authenticate the user's identity (AUTHENTICATE). The user 52 may be asked if the user 52 intends the effect that the commands of the user 52 are likely to have (VERIFY). Corroboration of the commands may be required from another party before the commands are implemented (CORROBORATE). The commands of the user 52 may be implemented but a backup of data or other information may be maintained for later restoration in case the commands prove to be improper (HEDGE). The user 52 may be tricked into believing that the commands have been implemented when, in fact, they have not (SPOOF). The commands of the user 52 can be simply rejected (REJECT). The current session can be simply terminated (TERMINATE). Moreover, combinations of these responses can also be implemented. These responses are stored and are accessed dependent upon the threat assessment received from the threat assessment module 46.

Accordingly, the skeptical system 12 acts as a filter on the commands of the user 52 and maintains a skepticism about the user 52 and the commands of the user 52.

As described above, the skeptical system 12 continuously monitors the authenticity of the user 52 and of the commands issued by the user 52. This continuous monitoring means asking whether the issuer of a command is really the entity it claims to be. The skeptical system 12 continuously evaluates the likely consequences of the commands it receives. Accordingly, the skeptical system 12 envisions the consequences of commands and assesses losses should those consequences occur. The skeptical system 12 continuously evaluates the probable intentions behind the commands it receives. Although intent recognition is difficult to achieve generally, certain normal and abnormal patterns of commands can strongly indicate either benign or malign intent. The skeptical system 12 actively intervenes only when safety, significant economic losses, and/or environmental jeopardy warrants intervention. The responses of the skeptical system 12 to user commands are conditioned by its best estimate of authenticity, integrity, consequences, and intent and are accordingly implemented in a graded manner. There is a spectrum of possible responses possible, from instant compliance to counter action. The skeptical system 12 preferably conceals its suspicions from doubted agents where revelation runs a risk of being exploited. Providing too much feedback can both be a distraction and allow the system to be more easily fooled.

The skeptical system 12 should be tamperproof. There should be no way for an attacker to subvert or sidestep the skeptical mechanisms. No artifact is imperious from tampering, but the threshold for attacks of this sort must be set high enough to make it very unattractive. The authority of the skeptical system 12 should preferably have a limit. Some person or group of persons should ultimately be able to countermand the judgment of the skeptical system 12. The authorized users of the skeptical system 12 should preferably know of its autonomy, its limits, and the protocol to override it. This information need not be widely shared, but its disclosure should not diminish its security.

Certain modifications of the present invention will occur to those practicing in the art of the present invention. For example, as described above, the skeptical system 12 monitors the identity and commands of the user 52. The user 52 has been shown as a human being. However, the user 52 need not be a human being. As a result, the skeptical system 12 can be used to monitor the identity and commands of other systems such as computers.

In the above description, the skeptical system 12 has been shown in connection with the protection of a chemical plant. However, the skeptical system 12 can be used to protect other assets. In each case, the plans stored in the plan library are tailored to the specific application.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A computer-implemented skeptical method comprising:
   monitoring commands of a user entered into a computer;
   predicting a plan of the user based on the monitored commands;
   assessing a threat based on the predicted plan;
   selecting, from among a plurality of possible responses, a response that is appropriate to the assessed threat; and
   executing the selected response to store the assessed threat.

2. The skeptical method of claim 1 wherein the assessing of the threat based on the user's intent and plan comprises:
   determining an identity of the user; and,
   assessing the thread based on the predicted plan and the identity of the user.

3. The skeptical method of claim 2 wherein the determining of an identity of the user comprises determining the identity of the user from a biometric input.

4. The skeptical method of claim 2 wherein the determining of an identity of the user comprises determining the identity of the user from a passive biometric input.

5. The skeptical method of claim 2 wherein the determining of an identity of the user comprises determining the identity of the user from an active biometric input.

6. The skeptical method of claim 2 wherein the determining of an identity of the user comprises providing a user with a message directing the user to authenticate the identity of the user.

7. The skeptical method of claim 2 wherein the determining of an identity of the user comprises determining the identity of the user from user patterns.

8. The skeptical method of claim 7 wherein the user patterns comprise command patterns of the user.

9. The skeptical method of claim 7 wherein the user patterns comprise typing patterns of the user.

10. The skeptical method of claim 7 wherein the user patterns comprise pointing patterns of the user.

11. The skeptical method of claim 2 wherein the determining of an identity of the user comprises determining the identity of the user from user patterns and from user authentication.

12. The skeptical method of claim 1 wherein the predicting of a plan of the user based on the monitored commands comprises:
    matching observed commands to plans in a stored plan library; and,
    predicting the plan of the user based on the matching plans.

13. The skeptical method of claim 12 further comprising determining unobserved actions of the user from the matching plans.

14. The skeptical method of claim 12 further comprising determining unobserved actions of the user from reports of state changes.

15. The skeptical method of claim 14 further comprising determining unobserved actions of the user from the matching plans.

16. The skeptical method of claim 1 further comprising determining unobserved actions of the user from reports of state changes.

17. The skeptical method of claim 1 wherein the selecting of a response that is appropriate to the assessed threat comprises selecting a response to hedge and limit risk.

18. The skeptical method of claim 1 wherein the plurality of possible responses comprises passing commands, logging commands, rejecting commands, and terminating a session.

19. The skeptical method of claim 18 wherein the plurality of possible responses comprises requiring the user to again provide the user's identity, asking the user if the effects of the commands are intended by the user, and requiring corroboration from another party.

20. The skeptical method of claim 1 wherein the plurality of possible responses comprises requiring the user to again provide the user's identity, asking the user if the effects of the commands are intended by the user, and requiring corroboration from another party.

21. The skeptical method of claim 1 wherein the assessing of the threat based on the predicted plan comprises maintaining user models and session models, wherein the user models relate to user identification, and wherein the session models relate to the predicted plan.

22. The skeptical method of claim 21 wherein the assessing of the threat based on the predicted plan further comprises maintaining cost models, wherein the cost models relate to consequential costs of the predicted plan.

23. The skeptical method of claim 21 wherein the session models are rendered as a Bayesian belief network.

24. A computer-implemented skeptical method comprising:
    monitoring commands of a user entered into a computer;
    matching the commands to plans stored in a plan library;
    predicting a plan of the user from the matching plans;
    receiving information related to an identity of the user;
    assessing a threat assessment from a memory based on the predicted plan and the user identification information;
    selecting, from among a plurality of possible responses, a response that is appropriate to the assessed threat assessment; and
    executing the selected response to store the assessed threat.

25. The skeptical method of claim 24 wherein the receiving of information related to an identity of the user comprises receiving a biometric input.

26. The skeptical method of claim 24 wherein the receiving of information related to an identity of the user comprises receiving identity information in response to a message directing the user to authenticate the identity of the user.

27. The skeptical method of claim 24 wherein the receiving of information related to an identity of the user comprises determining identity from user patterns.

28. The skeptical method of claim 24 wherein the receiving of information related to an identity of the user comprises determining the identity of the user from user patterns and from user authentication.

29. The skeptical method of claim 24 further comprising determining unobserved actions of the user from the matching plans.

30. The skeptical method of claim 24 further comprising determining unobserved actions of the user from reports of state changes.

31. The skeptical method of claim 24 wherein the selecting of a response that is appropriate to the accessed threat assessment comprises selecting a response to hedge and limit risk.

32. The skeptical method of claim 24 wherein the plurality of possible responses comprises passing commands, logging commands, rejecting commands, and terminating a session.

33. The skeptical method of claim 24 wherein the plurality of possible responses comprises requiring the user to again provide the user's identity, asking the user if the effects of the commands are intended by the user, and requiring corroboration from another party.

34. The skeptical method of claim 24 wherein the assessing of the threat assessment comprises maintaining user models and session models, wherein the user models relate to user identification, and wherein the session models relate to the predicted plan.

35. The skeptical method of claim 34 wherein the assessing of the threat assessment further comprises maintaining cost models, wherein the cost models relate to consequential costs of the predicted plan.

36. The skeptical method of claim 34 wherein the session models are rendered as a Bayesian belief network.

* * * * *